United States Patent
Morton et al.

(10) Patent No.: US 7,933,750 B2
(45) Date of Patent: Apr. 26, 2011

(54) METHOD FOR DEFINING REGIONS IN RESERVOIR SIMULATION

(75) Inventors: Alison Morton, Bicester (GB); Andrew Priestley, Abingdon (GB)

(73) Assignee: Schlumberger Technology Corp, Houston, TX (US)

( * ) Notice: Subject to any disclaimer, the term of this patent is extended or adjusted under 35 U.S.C. 154(b) by 465 days.

(21) Appl. No.: 12/080,267

(22) Filed: Apr. 2, 2008

(65) Prior Publication Data

US 2009/0254324 A1    Oct. 8, 2009

(51) Int. Cl.
    *G06F 17/50*    (2006.01)
(52) U.S. Cl. .............. 703/2; 703/10; 702/7; 702/11; 702/12; 702/14
(58) Field of Classification Search ........... 703/2, 10; 702/7, 11, 12, 14
    See application file for complete search history.

(56) References Cited

U.S. PATENT DOCUMENTS

| | | | |
|---|---|---|---|
| 6,106,561 A | 8/2000 | Farmer | |
| 6,230,101 B1 | 5/2001 | Wallis | |
| 7,363,163 B2 * | 4/2008 | Le Ra Valec-Dupin et al. | 702/12 |
| 7,400,978 B2 * | 7/2008 | Langlais et al. | 702/14 |
| 2005/0015231 A1 * | 1/2005 | Edwards et al. | 703/10 |
| 2006/0277012 A1 | 12/2006 | Ricard | |
| 2007/0055447 A1 * | 3/2007 | Mickaele et al. | 702/7 |
| 2007/0156341 A1 * | 7/2007 | Langlais et al. | 702/11 |

FOREIGN PATENT DOCUMENTS

GB    2413200    10/2005

\* cited by examiner

*Primary Examiner* — Thai Phan

(57) ABSTRACT

A method is disclosed, which is practiced by a reservoir simulator, for simulating a reservoir and generating a set of simulation results, the simulation results including a framework, the framework further including a plurality of grid cells, comprising: generating one or more static and dynamic regions within the grid cells of the framework of the simulation results, the static and dynamic regions each having region values, wherein the region values of the static regions cannot be allowed to change dynamically, and wherein the region values of the dynamic regions can be allowed to change dynamically.

24 Claims, 11 Drawing Sheets

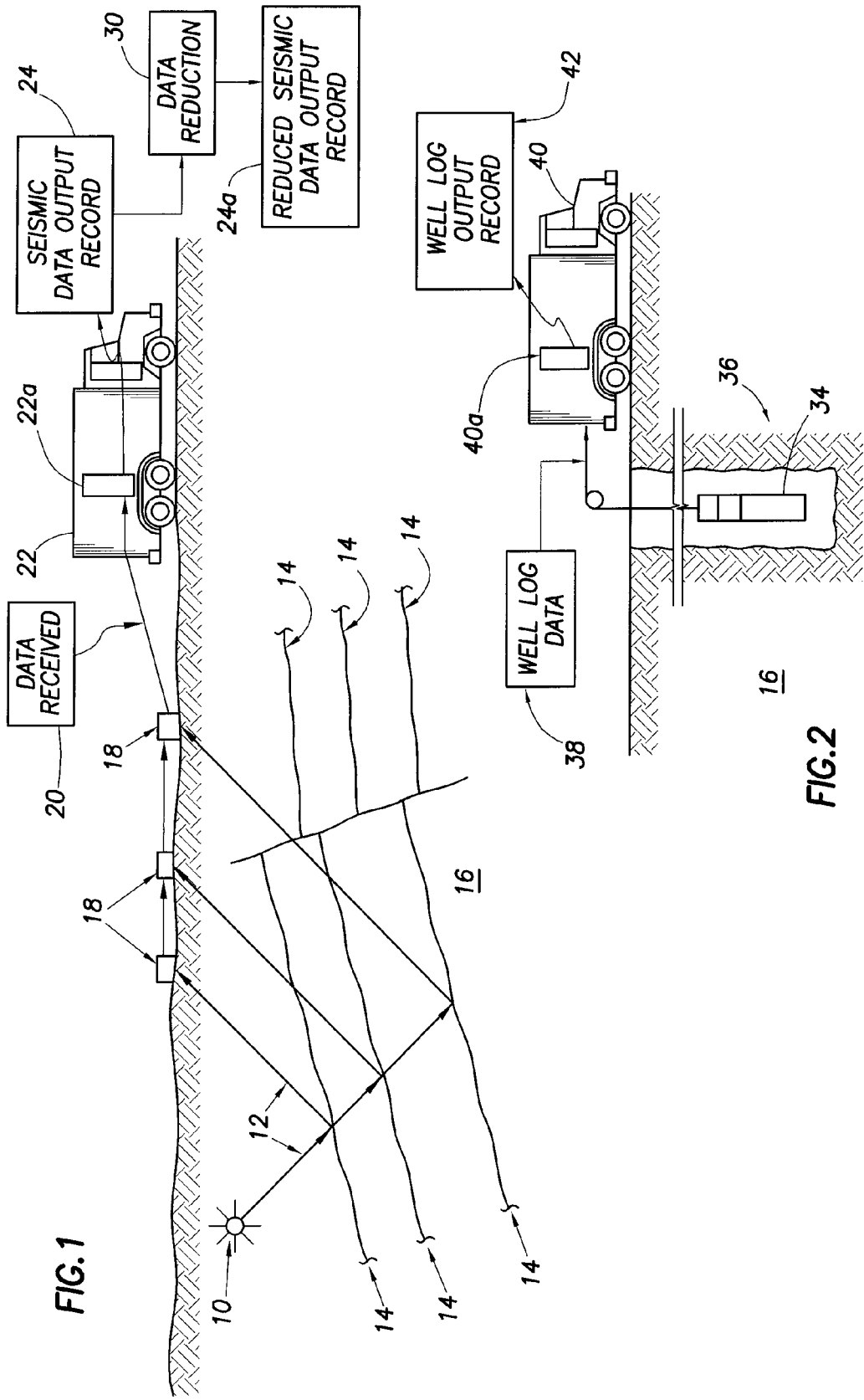

METHOD FOR DEFINING REGIONS IN RESERVOIR SIMULATION

BACKGROUND

The subject matter set forth in this specification relates to a method, including a corresponding system and program storage device and computer program, for defining 'regions', both static and dynamic, in reservoir simulation, the 'regions' being based on complex logical definitions which can be both statically and/or dynamically defined.

Many clients are interested in a 'method for simulating fracturing and geomechanics'. This type of simulation can currently be attempted by altering rock and grid properties in a reservoir simulator (for instance, transmissibilities) on a user-specified cell-by-cell basis. However, the aforementioned 'method for simulating fracturing and geomechanics' is extremely simplistic, and very restrictive.

This specification discloses a 'Method for Defining Regions in Reservoir Simulation', including an associated system and program storage device and computer program, which would allow a user to define 'regions' in a reservoir simulator, where the 'regions' are based on complex logical definitions that can be statically and/or dynamically defined.

A U.S. Pat. No. 6,230,101 B1 to Wallis is entitled "Simulation Method and Apparatus", the disclosure of which is incorporated by reference into this specification.

A U.S. Pat. No. 6,106,561 to Farmer is entitled "Simulation Gridding method and apparatus including a structured areal gridder adapted for use by a reservoir simulator", the disclosure of which is incorporated by reference into this specification.

SUMMARY

One aspect of the present invention involves a method practiced by a reservoir simulator for simulating a reservoir and generating a set of simulation results, the simulation results including a framework, the framework further including a plurality of grid cells, comprising: generating one or more static and dynamic regions within the grid cells of the framework of the simulation results, the static and dynamic regions each having region values, wherein the region values of the static regions cannot be allowed to change dynamically, and wherein the region values of the dynamic regions can be allowed to change dynamically.

Another aspect of the present invention involves a program storage device readable by a machine tangibly embodying a set of instructions executable by the machine to perform method steps for simulating a reservoir and generating a set of simulation results, the simulation results including a framework, the framework further including a plurality of grid cells, the method steps comprising: generating one or more static and dynamic regions within the grid cells of the framework of the simulation results, the static and dynamic regions each having region values, wherein the region values of the static regions cannot be allowed to change dynamically, and wherein the region values of the dynamic regions can be allowed to change dynamically.

Another aspect of the present invention involves a computer program adapted to be executed by a processor, the computer program, when executed by the processor, conducting a process for simulating a reservoir and generating a set of simulation results, the simulation results including a framework, the framework further including a plurality of grid cells, the process comprising: generating one or more static and dynamic regions within the grid cells of the framework of the simulation results, the static and dynamic regions each having region values, wherein the region values of the static regions cannot be allowed to change dynamically, and wherein the region values of the dynamic regions can be allowed to change dynamically.

Another aspect of the present invention involves a system adapted for simulating a reservoir while using region data and generating a set of simulation results, the simulation results including a framework which further includes a plurality of grid cells, comprising: apparatus adapted for generating one or more static and dynamic regions among the grid cells of the framework of the simulation results, the regions among the grid cells including static regions of grid cells which cannot be allowed to change dynamically and dynamic regions of grid cells which can be allowed to change dynamically.

Further scope of applicability will become apparent from the detailed description presented hereinafter. It should be understood, however, that the detailed description and the specific examples set forth below are given by way of illustration only, since various changes and modifications within the spirit and scope of the 'Method for Defining Regions in Reservoir Simulation', as described and claimed in this specification, will become obvious to one skilled in the art from a reading of the following detailed description.

BRIEF DESCRIPTION OF THE DRAWINGS

A full understanding will be obtained from the detailed description presented hereinbelow, and the accompanying drawings which are given by way of illustration only and are not intended to be limitative to any extent, and wherein:

FIG. 1 illustrates a seismic operation for producing a reduced seismic data output record, the seismic operation of FIG. 1 including a data reduction operation;

FIG. 2 illustrates a wellbore operation for producing a well log output record;

DETAILED DESCRIPTION

Figure 3:
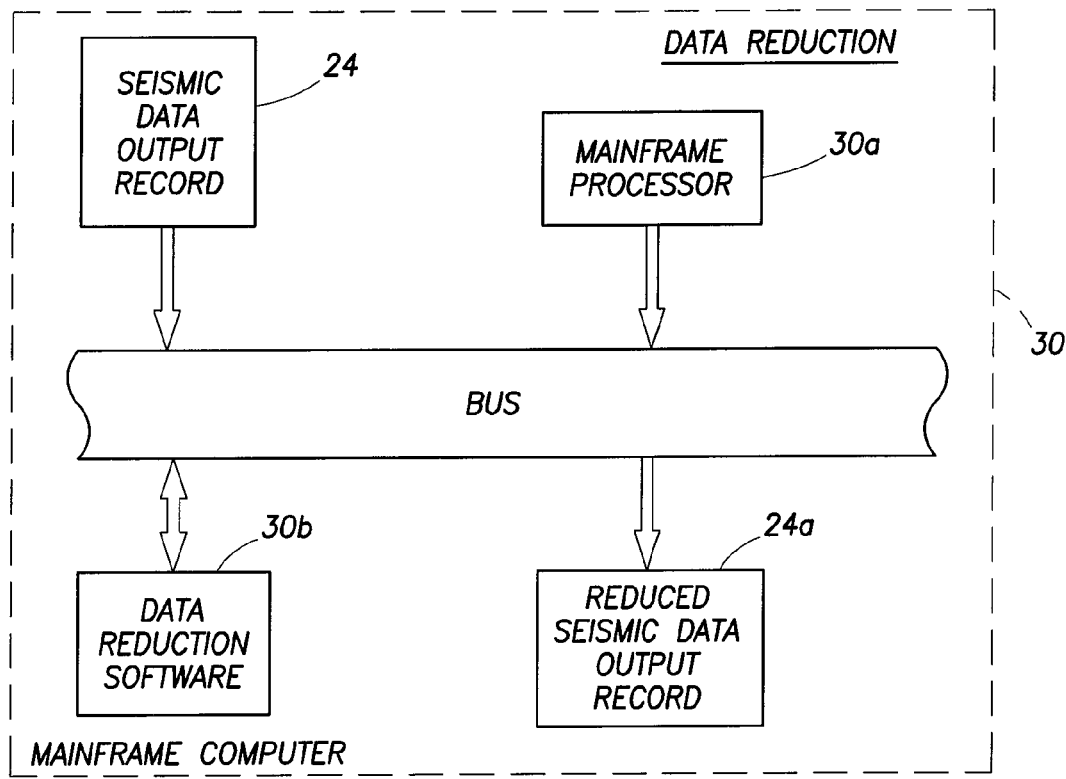
FIG. 3 illustrates a computer system for performing the data reduction operation of FIG. 1.

This specification discloses a 'Method for Defining Regions in Reservoir Simulation', including an associated system and program storage device and computer program, which would allow a user to define 'regions' in a reservoir simulator, where the 'regions' are based on complex logical definitions that can be statically and/or dynamically defined. This will allow 'property and reporting regions' to be defined and altered, throughout the simulation run, by a user supplied definition. For instance, since each 'fluid' has a corresponding 'property', the 'Method for Defining Regions in Reservoir Simulation' disclosed in this specification would allow the 'properties of a fluid' to follow its corresponding 'fluid'. In addition, the 'Method for Defining Regions in Reservoir Simulation' disclosed in this specification could also be useful to focus on an area of a model in order to visualize all the grid blocks whose fluid moves towards the well (focusing on the drainage radius for a production well); or for finding areas of remaining mobile oil, for example, and where to drill the next well based on certain criteria.

Oil and gas is produced from underground rock formations. These rocks are porous, just like a sponge, and they are filled with fluid, usually water. This porous characteristic of rocks is known as porosity. These rocks in addition to being porous have the ability to allow fluids to flow through the pores, a characteristic measured by a property called permeability. When oil (or gas) is trapped in such formations, it may be possible to extract it by drilling wells that tap into the formation. As long as the pressure in the well is lower than that in the rock formation, the fluids contained in the pores will flow into the well. These fluids may then flow naturally up the well to the surface, or the flow up the well may have to be assisted by pumps. The relative amounts of oil, gas and water that are produced at the surface will depend on the fraction of the rock pore space that is occupied by each type of fluid. Water is always present in the pores, but it will not flow unless its volume fraction exceeds a threshold value that varies from one type of rock to another. Similarly, oil and gas will only flow as long as their volume fractions exceed their own thresholds.

The characteristics of the rock (including porosity and permeability) in an oil reservoir vary greatly from one location to another. As a result, the relative amounts of oil, gas and water that can be produced will also vary from reservoir to reservoir. These variations make it difficult to simply predict the amount of fluids and gases a reservoir will produce and the amount of resources it will require to produce from a particular reservoir. However, the parties interested in producing from a reservoir need to project the production of the reservoir with some accuracy in order to determine the feasibility of producing from that reservoir. Therefore, in order to accurately forecast production rates from all of the wells in a reservoir, it is necessary to build a detailed mathematical model of the reservoir's geology and geometry.

A large amount of research has been focused on the development of reservoir simulation tools. These tools include mathematical and computer models that describe and which are used to predict, the multiphase flow of oil and gas within a three dimensional underground formation (a "field"). Reservoir tools use empirically acquired data to describe a field. These data are combined with and manipulated by mathematical models whose output describes specified characteristics of the field at a future time and in terms of measurable quantities such as the production or injection rates of individual wells and groups of wells, the bottom hole or tubing head pressure at each well, and the distribution of pressure and fluid phases within the reservoir.

The mathematical model of a reservoir is typically done by dividing the reservoir volume into a large number of interconnected cells and estimating the average permeability, porosity and other rock properties for each cell. This process makes use of seismic data, well logs, and rock cores recovered when wells are drilled. Production from the reservoir can then be mathematically modeled by numerically solving a system of three or more nonlinear, partial differential equations describing fluid flow in the reservoir.

Computer analysis of production from an oil reservoir is usually divided into two phases, history matching and prediction. In the history matching phase, the past production behavior of the reservoir and its wells is repeatedly modeled, beginning with initial production and continuing up to the present time. The first computer run is based on a geological model as described above. After each run, the computer results are compared in detail with data gathered in the oil field during the entire period of production. Geoscientists modify the geological model of the reservoir on the basis of the differences between computed and actual production performance and rerun the computer model. This process continues until the mathematical reservoir model behaves like the real oil reservoir.

Once a suitable history match has been obtained, production from the oil reservoir can be predicted far into the future (sometimes for as long as 50 years). Oil recovery can be maximized and production costs minimized by comparing many alternative operating plans, each requiring a new run of the computer model. After a field development plan is put into action, the reservoir model may be periodically rerun and further tuned to improve its ability to match newly gathered production data.

When sufficient data is obtained about the reservoir, characteristics of a reservoir can be mathematically modeled to predict production rates from wells in that reservoir. The gross characteristics of the field include the porosity and permeability of the reservoir rocks, the thickness of the geological zones, the location and characteristics of geological faults, relative permeability and capillary pressure functions and such characteristics of the reservoir fluids as density, viscosity and phase equilibrium relationships. From this data, a set of continuous partial differential equations (PDEs) are generated that describe the behavior of the field as a function of time and production parameters. These production parameters include the locations of wells, the characteristics of the well's completions, and the operating constraints applied to the wells. Operating constraints may include such as the production rate of a particular fluid phase, the bottom hole pressure, the tubing head pressure, or the combined flow rates of a group of wells. These constraints may be applied directly by data or by means of another simulator that models the flow of fluids in the surface equipment used to transport the fluids produced from or injected into the wells. However, because only the simplest system of PDEs can be solved using classic or closed-form techniques (e.g., a homogeneous field having circular boundaries), a model's PDEs are converted into a set of non-linear approximations which are then solved numerically. One approximation technique is the finite difference method. In the finite difference method, reservoir PDEs are converted into a series of difference quotients which divide a reservoir into a collection of discrete three dimensional cells, which are then solved for at discrete times to determine (or predict) the value of reservoir characteristics such as pressure, permeability, fluid fractions, and at a later time.

Within the computerized 'reservoir simulator', reservoir performance is modeled in discrete increments of time. Each so-called timestep advances the solution from a previous point in time, where all variables are known, to a future point in time, where all variables are unknown. This process is repeated until the entire time period of interest has been modeled. Within each timestep, it is necessary to solve a huge system of nonlinear equations that models fluid flow from cell to cell and through the wells. (With current technology it is possible to include several million cells in the reservoir model.) Solutions to the system of nonlinear equations are obtained by Newton iteration. In each such iteration, the system of nonlinear equations is approximated by a system of linear equations, which must be solved by yet another iterative procedure. One such 'reservoir simulator' is the "ECLIPSE" reservoir simulator that is owned and operated by Schlumberger Technology Corporation of Houston, Tex.

The "ECLIPSE" simulator software receives output data from the "FloGrid" simulation gridding software and the "ECLIPSE" simulator software generates a set of simulation results which are displayed on a 3D viewer. The "FloGrid" simulation gridding software is described in U.S. Pat. No. 6,106,561 to Farmer, the disclosure of which is incorporated by reference into this specification. A vast amount of "FloGrid" functionality has been incorporated into the "Petrel" simulation gridding software, although currently there is no unstructured gridding support. Similar references can also be made regarding "Petrel" simulation gridding software, but for the purposes of this specification document, all references here will be made to "FloGrid". The concept presented here can be utilized on complex unstructured grids, as well as structured grids.

The input data for "ECLIPSE" is prepared in free format using a keyword system, wherein the ECLIPSE simulator software 46b (of FIG. 10a) will read the 'keyword' (and any information that this keyword contained) from the Input File 90 of FIG. 10a, and, responsive thereto, the ECLIPSE simulator software 46b will process the 'keyword' according to: the 'section' in which the 'keyword' was placed, and the purpose of that 'keyword'. Any standard editor may be used to prepare the input file. After the simulation is run, various methods of output can be requested to analyze the results, for instance, print file, restart file, and summary file. Some of these are useful to view in a editor, others can be used for visualization purposes. Further details will be provided in the following section.

This specification includes: (1) a background discussion with reference to FIGS. 1 through 9 which provides background information relating to the performance of a seismic operation and a well logging operation adapted for generating seismic and well logging data, the seismic and well logging data being provided as input data to a workstation that stores a "FloGrid" simulation gridding software and an "ECLIPSE" simulator software, and (2) a description of the "ECLIPSE" simulator software which further includes a 'Static Region' and a 'Dynamic Region' functionality that is discussed below with reference to FIGS. 10a through 13 of the drawings. The "ECLIPSE" simulator software and the "FloGrid" simulation gridding software are products that are owned and operated by Schumberger Technology Corporation of Houston, Tex.

Referring to FIG. 1, a method and apparatus for performing a seismic operation is illustrated. During a seismic operation, a source of acoustic energy or sound vibrations 10, such as an explosive energy source 10, produces a plurality of sound vibrations. In FIG. 1, one such sound vibration 12 reflects off a plurality of horizons 14 in an earth formation 16. The sound vibration(s) 12 is (are) received in a plurality of geophone-receivers 18 situated on the earth's surface, and the geophones 18 produce electrical output signals, referred to as "data received" 20 in FIG. 1, in response to the received sound vibration(s) 12 representative of different parameters (such as amplitude and/or frequency) of the sound vibration(s) 12. The "data received" 20 is provided as "input data" to a computer 22a of a recording truck 22, and, responsive to the "input data", the recording truck computer 22a generates a "seismic data output record" 24. Later in the processing of the seismic data output record 24, such seismic data undergoes "data reduction" 30 in a mainframe computer, and a "reduced seismic data output record" 24a is generated from that data reduction operation 30.

Referring to FIG. 2, a well logging operation is illustrated. During the well logging operation, a well logging tool 34 is lowered into the earth formation 16 of FIG. 1 which is penetrated by a borehole 36. In response to the well logging operation, well log data 38 is generated from the well logging tool 34, the well log data 38 being provided as "input data" to a computer 40a of a well logging truck 40. Responsive to the well log data 38, the well logging truck computer 40a produces a "well log output record" 42.

Referring to FIG. 3, the seismic data output record 24 of FIG. 1 is provided as "input data" to a mainframe computer 30 where the data reduction operation 30 of FIG. 1 is performed. A mainframe processor 30a will execute a data reduction software 30b stored in a mainframe storage 30b. When the execution of the data reduction software 30b is complete, the reduced seismic data output record 24a of FIGS. 1 and 3 is generated.

Figure 4:
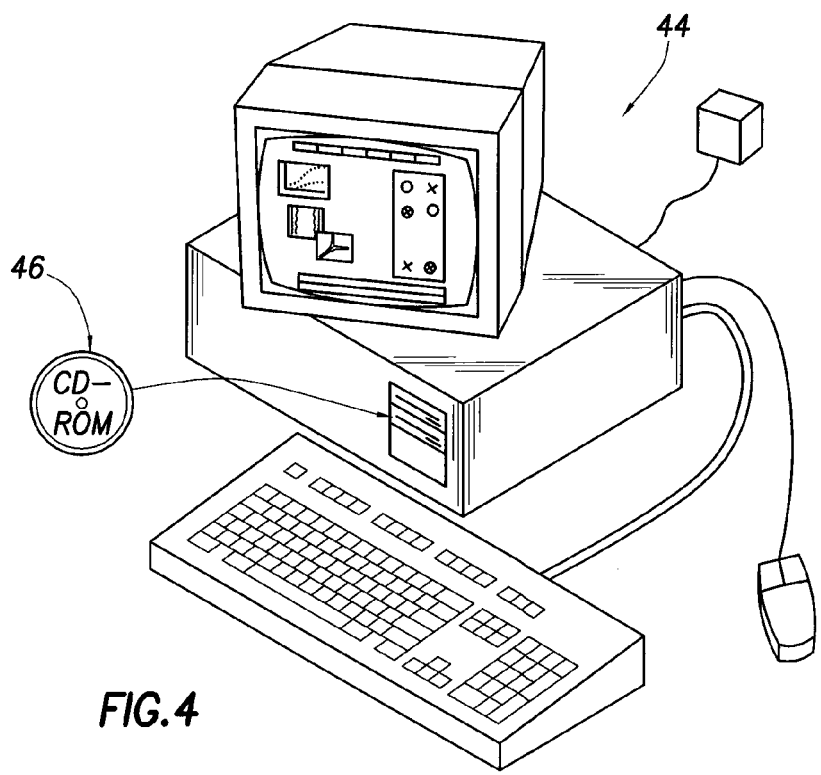
FIGS. 4 and 5 illustrate a workstation adapted for storing a "Flogrid" software and an "Eclipse" simulator software.
Figure 5:
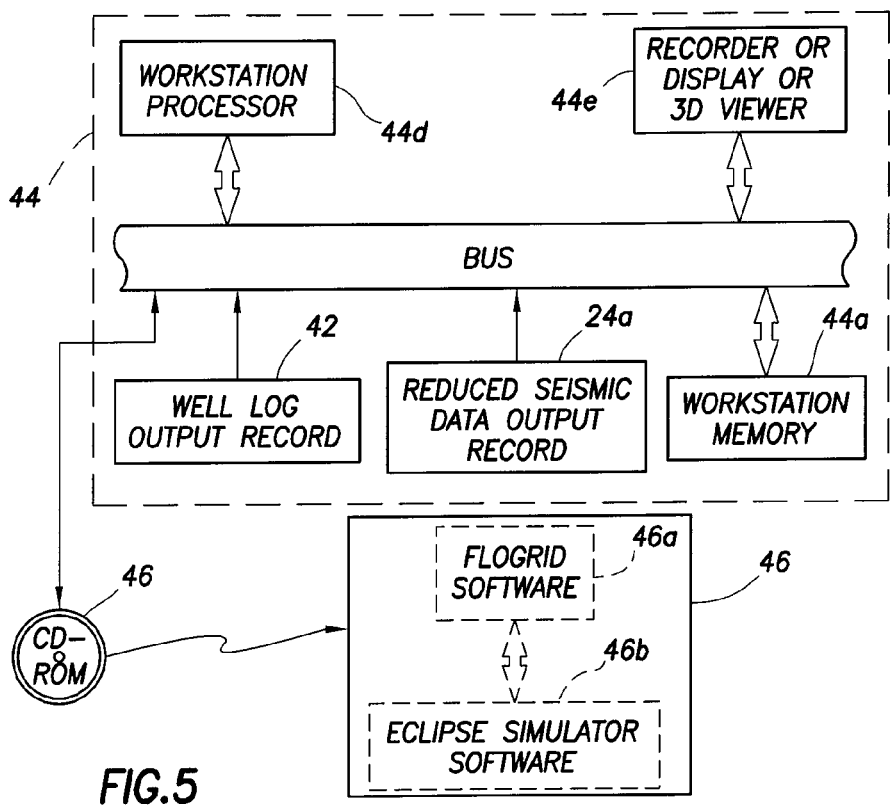

Referring to FIGS. 4 and 5, a workstation 44 is illustrated in FIG. 4. A storage medium 46, such as a CD-Rom 46, stores software, and that software can be loaded into the workstation 44 for storage in the memory of the workstation. In FIG. 5, the workstation 44 includes a workstation memory 44a, the software stored on the storage medium (CD-Rom) 46 being loaded into the workstation 44 and stored in the workstation memory 44a. A workstation processor 44d will execute the software stored in the workstation memory 44a in response to certain input data provided to the workstation processor 44d, and then the processor 44d will display or record the results of that processing on the workstation "recorder or display or 3D viewer" 44e. The input data, that is provided to the workstation 44 in FIG. 5, includes the well log output record 42 and the reduced seismic data output record 24a. The "well log output record" 42 represents the well log data generated during the well logging operation in an earth formation of FIG. 2, and the "reduced seismic data output record" 24a represents data-reduced seismic data generated by the mainframe computer 30 in FIG. 3 in response to the seismic operation illustrated in FIG. 1. In FIG. 5, the software stored on the storage medium (CD-Rom) 46 in FIG. 5 includes a "Flogrid" software 46a and an "Eclipse" simulator software 46b. When the storage medium (CD-Rom) 46 is inserted into the workstation 44 of FIG. 5, the "Flogrid" software 46a and the "Eclipse" simulator software 46b, stored on the CD-Rom 46, are both loaded into the workstation 44 and stored in the workstation memory 44a. The "Flogrid" software 46a is fully discussed in U.S. Pat. No. 6,106,561 to Farmer, entitled "Simulation Gridding method and apparatus including a structured areal gridder adapted for use by a reservoir simulator", the disclosure of which is incorporated by reference into the specification of this specification. When the workstation processor 44d executes the Flogrid software 46a and the Eclipse simulator software 46b, the "Eclipse" simulator software 46b responds to a set of more accurate grid cell property information associated with a respective set of grid blocks of a structured simulation grid generated by the "Flogrid" software 46a by further generating a set of more accurate simulation results which are associated, respectively, with the set of grid blocks of the simulation grid. Those simulation results are displayed on the 3D viewer 44e of FIG. 5 and can be recorded on a recorder 44e.

Figure 6:
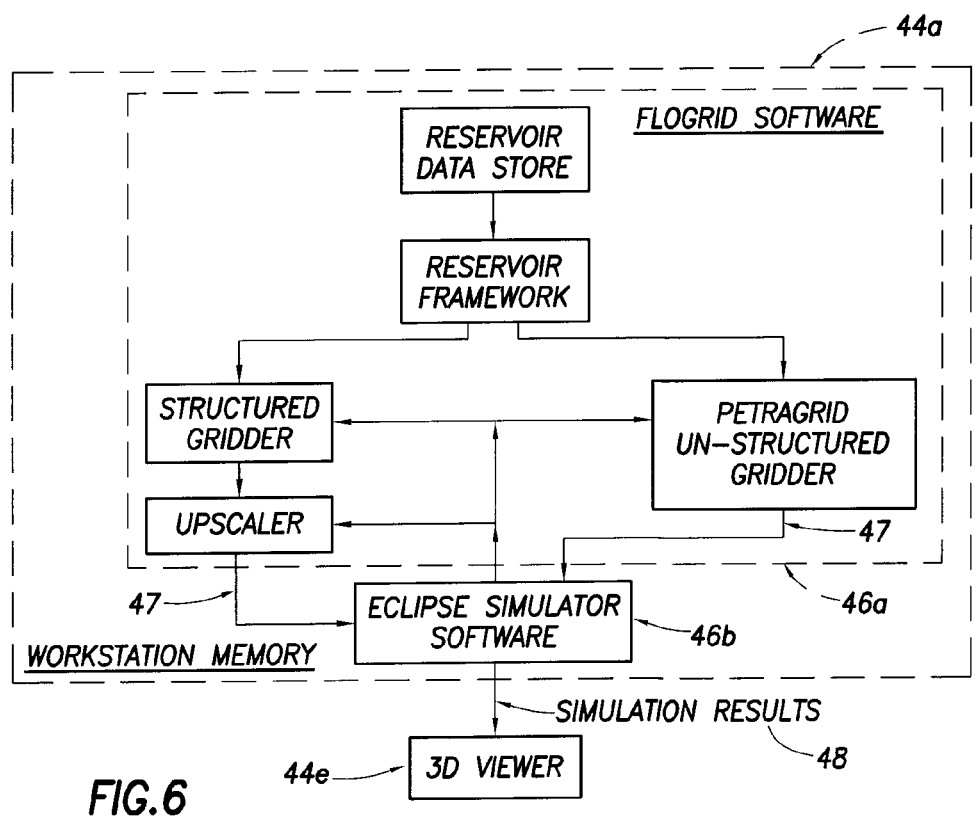
FIGS. 6 and 7 illustrate a more detailed construction of the "Flogrid" software of FIG. 5 which is adapted for generating output data for use by the "Eclipse" simulator software, the Eclipse simulator software including a 'Method for Defining Regions in Reservoir Simulation'(including an associated system and program storage device and computer program)
Figure 7:
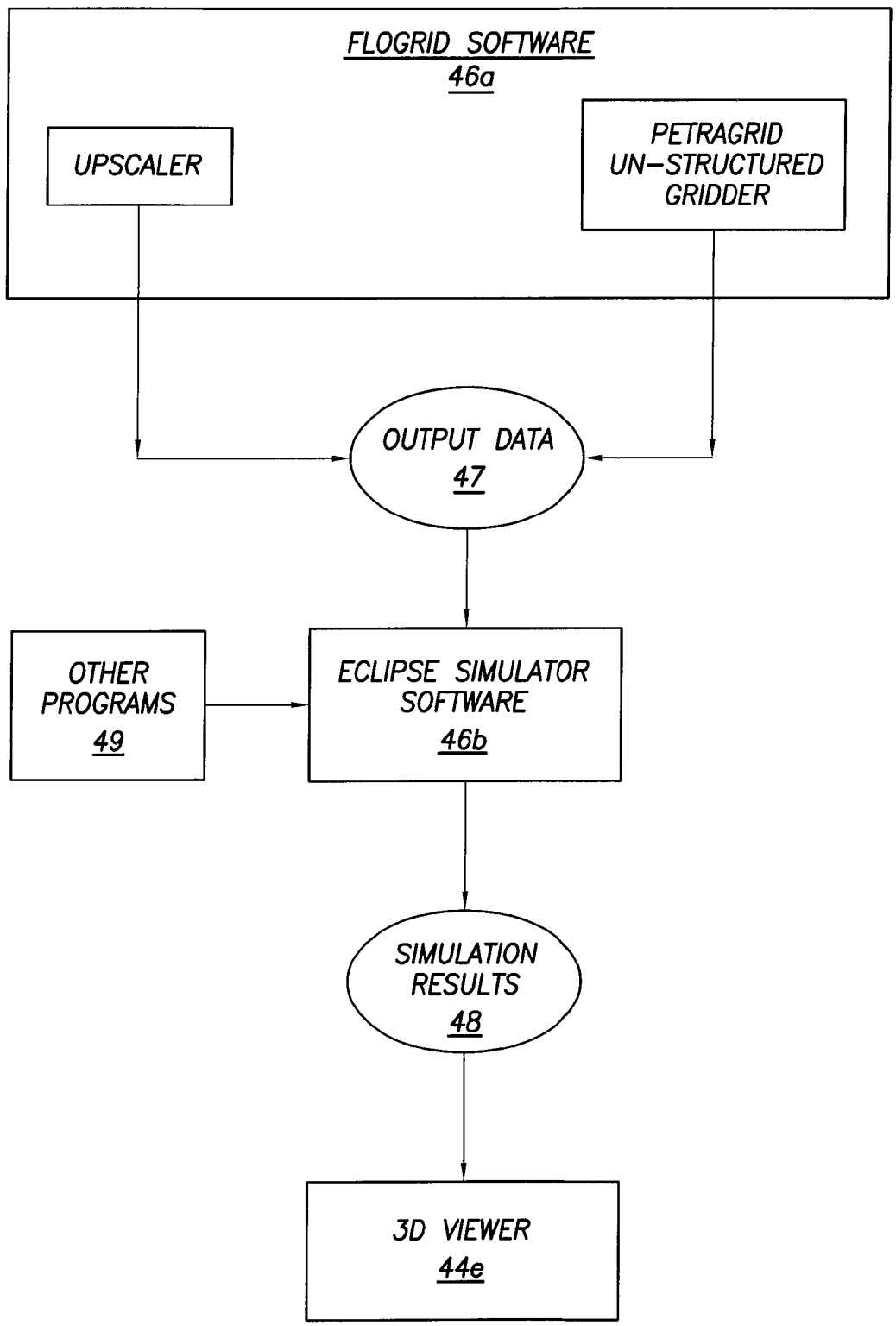

Referring to FIGS. 6 and 7, in FIG. 6, the Flogrid software 46a and the Eclipse simulator software 46b are illustrated as being stored in the workstation memory 44a of FIG. 5. In addition, the "simulation results" 48, which are output from the Eclipse simulator software 46b, are illustrated as being received by and displayed on the 3D viewer 44e. The Flogrid software 46a includes a reservoir data store, a reservoir framework, a structured gridder, an unstructured gridder, and an upscaler, all of which are fully discussed in the U.S. Pat. No. 6,106,561 to Farmer, the disclosure of which has already been incorporated by reference into this specification. In FIG. 6, a set of "simulation grids and properties associated with the grids" 47, generated by the Upscaler and the "Petragrid" unstructured gridder, are received by the Eclipse simulator software 46b. In response, the Eclipse simulator software 46b generates a "set of simulation results associated, respectively, with a set of grid blocks of the simulation grids" 48, and the simulation results and the associated grid blocks 48 are displayed on the 3D viewer 44e.

In FIG. 7, the Flogrid software 46a generates a set of output data 47 comprising a plurality of grid cells and certain properties associated with those grid cells. That output data 47 is provided as input data to the Eclipse simulator software 46b. Some other programs 49 provide other input data to the Eclipse simulator software 46b. In response to the output data 47 (comprised of a gridded earth formation including a plurality of grid cells and certain properties associated with each of the grid cells), as well as the other output data from the other programs 49, the Eclipse simulator software 46b generates a set of "simulation results" 48, the simulation results 48 including the plurality of grid cells and a plurality of simulation results associated, respectively, with the plurality of grid cells. The aforementioned plurality of grid cells and the plurality of simulation results associated, respectively, with the plurality of grid cells are displayed on the 3D Viewer 44e of FIGS. 6 and 7.

Figure 8:
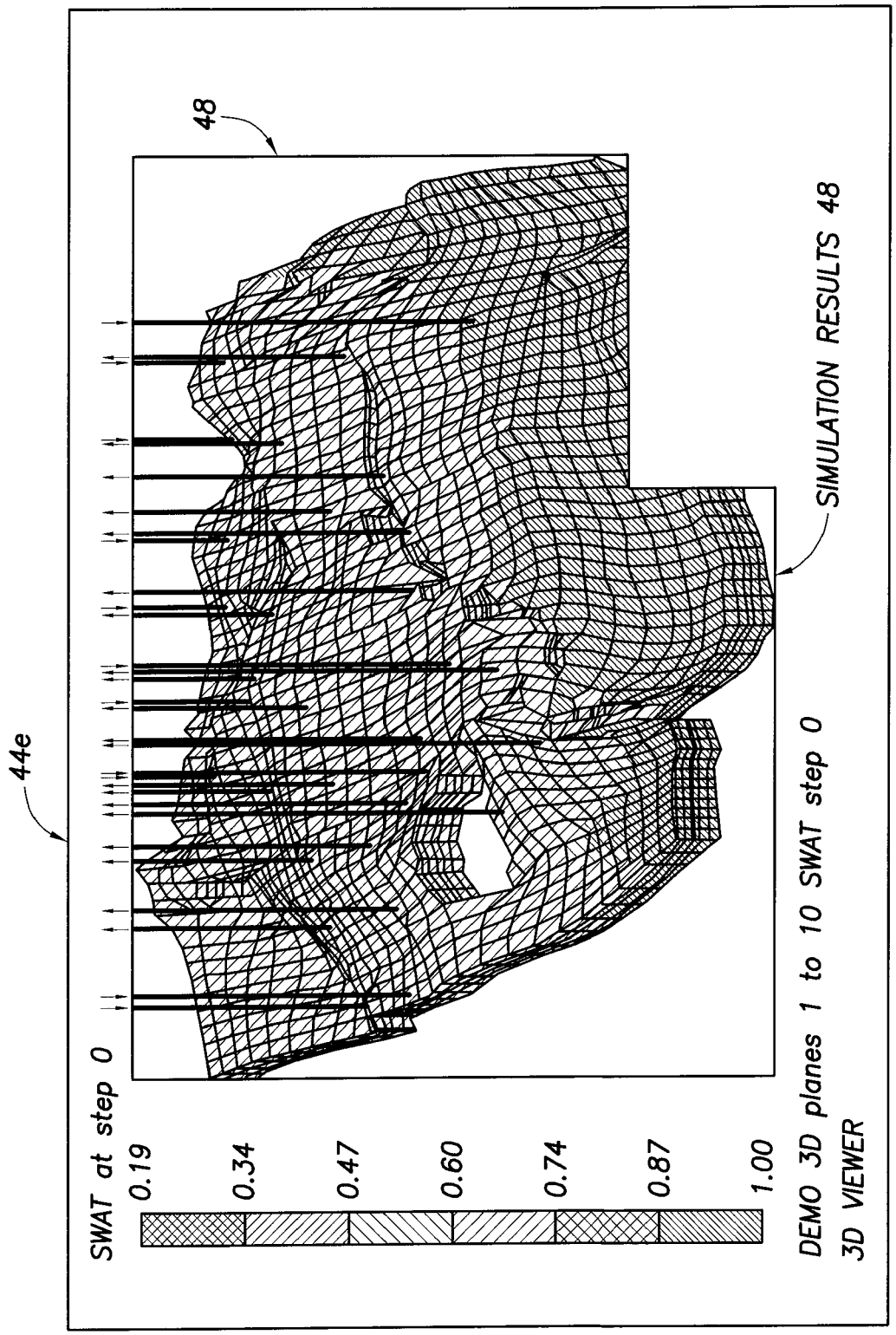
FIG. 8 illustrates an example of a typical output display generated by the "Eclipse" simulator software of FIG. 6 which is displayed on the 3D viewer of FIG. 6 where the output display will record or display a set of 'simulation results'.

Referring to FIG. 8, an example of the simulation results 48 (i.e., the "plurality of grid cells and the plurality of simulation results associated, respectively, with the plurality of grid cells" 48) which are displayed on the 3D viewer 44e of FIGS. 5 and 6 and 7, are illustrated. In FIG. 8, note that the simulation results 48 include a 'reservoir framework' that further incorporates or includes a multitude of 'grid cells', the 'grid cells' including 'structured grid cells' and 'un-structured grid cells'.

Figure 9:
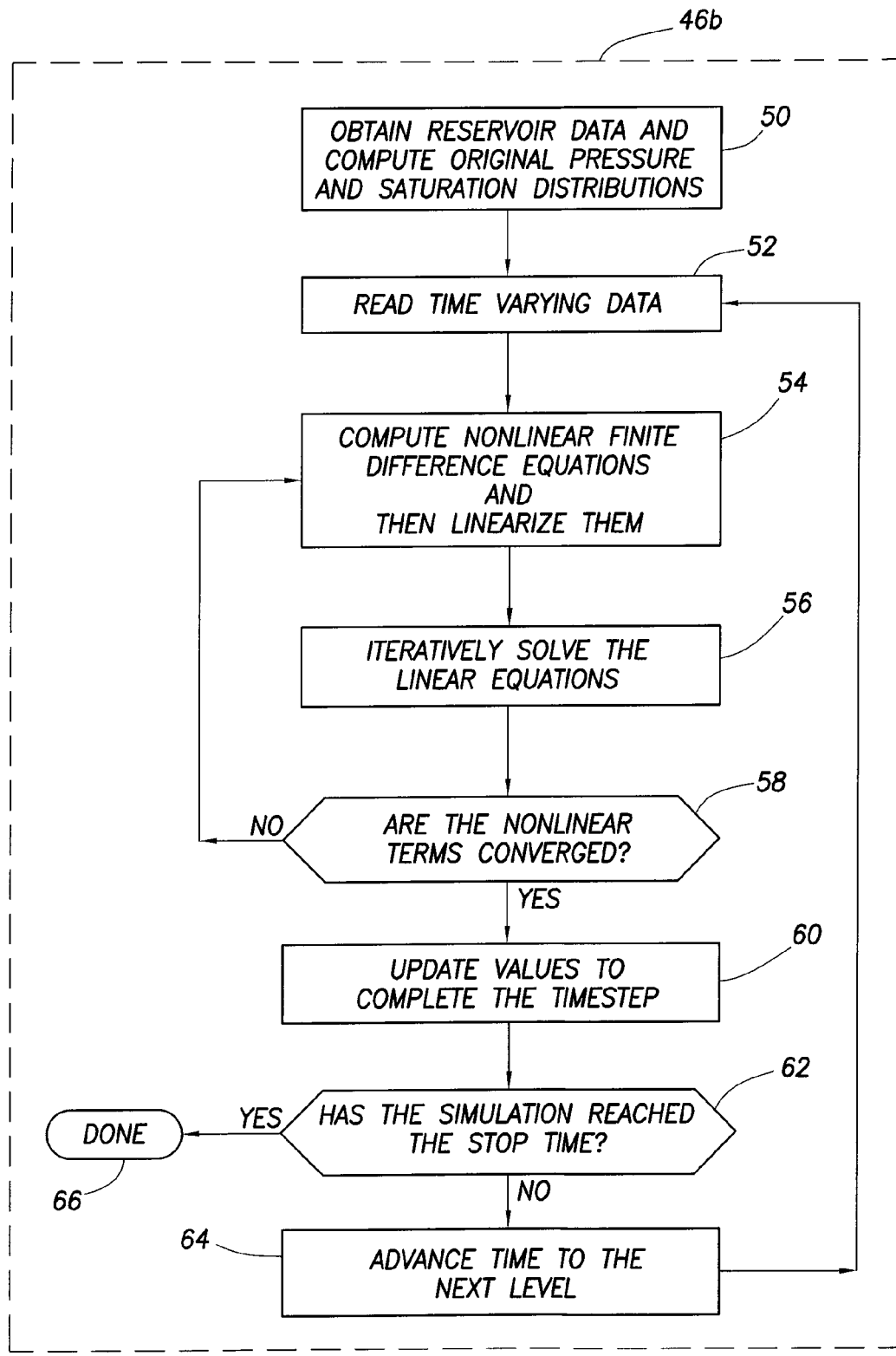
FIG. 9 illustrates a method of performing reservoir simulation which has been practiced by reservoir simulators.

Referring to FIG. 9, a general outline of the operation of a reservoir simulator is discussed below with reference to FIG. 9. In FIG. 9, reservoir data 42 and 24a of FIG. 5 and 'rock core data' are used to describe a computational grid and the properties of the reservoir rocks. This data is combined with data relating to the physical properties of the fluids contained in the reservoir, the combined data being used to compute the initial distributions of pressure and fluid saturations (volume fractions) as well as the composition of each fluid phase, block 50 in FIG. 9. Time varying data, such as the locations and characteristics of wells, production and injection flow rate controls, and simulator control information is read from a data base, block 52. Using the current pressure, saturation, and fluid compositions for each grid cell, the partial differential equations describing mass balances are approximated by finite differences in block 54 which results in two or more nonlinear algebraic equations for each grid cell. Also, in block 54, these nonlinear equations are linearized by means of Newton's method. In block 56, the resulting system of linear equations is solved iteratively. After the linear equations have been solved, there is a test in block 58 to determine whether all of the nonlinear terms in the finite difference equations have converged. If not, the simulator returns to block 54. If the nonlinear terms in the finite difference equations have converged, the simulator moves to block 60 and updates values to complete the current timestep. In block 62, the simulator tests to determine whether the desired ending time (i.e., the stop time) in the simulation has been reached. If not, the simulator advances time to the next level, block 64, and then it returns to block 52 to read new time varying data and to begin the next timestep. If the endpoint of the simulation has been reached, then, the simulator completes output operations and the run is finished, block 66.

In the following section of this specification, the ECLIPSE Simulator Software 46b of FIGS. 5, 6, and 7 includes both: a 'Static Region' software and a 'Dynamic Region' software. The 'Static Region' software and the 'Dynamic Region' software associated with the ECLIPSE Simulator Software 46b will be discussed in detail below with reference to FIGS. 10 through 16 of the drawings.

Figure 10:
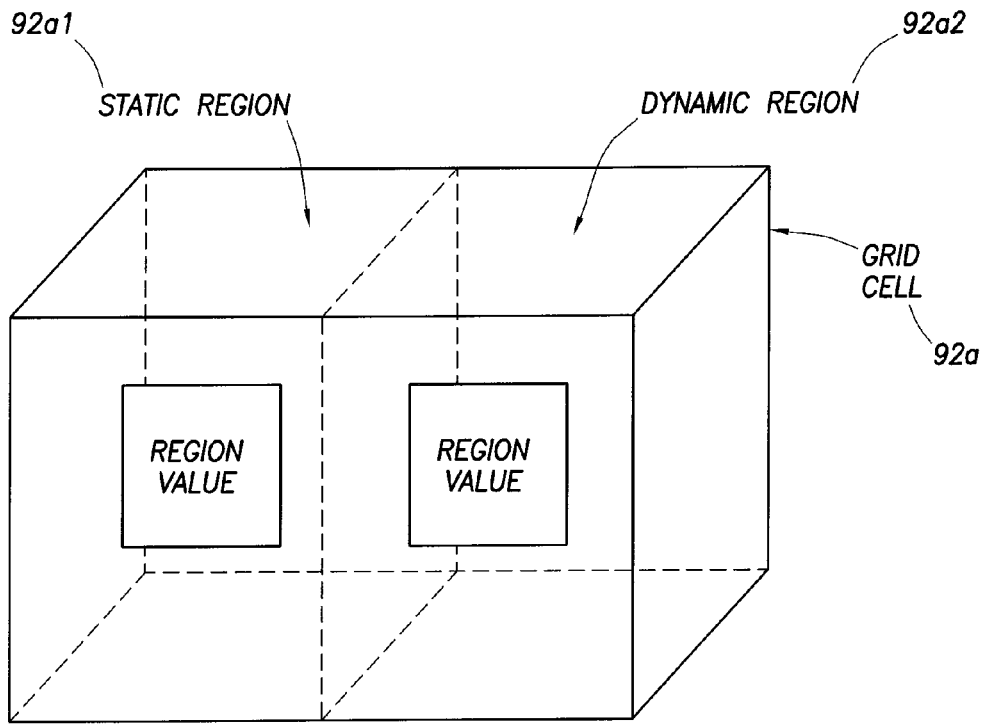
FIG. 10 illustrates one of the grid cells of the simulation results of FIGS. 12 and 13 wherein the grid cell includes four regions, a static region, a dynamic region, a saturation table region, and an equation of state region.
Figure 12:
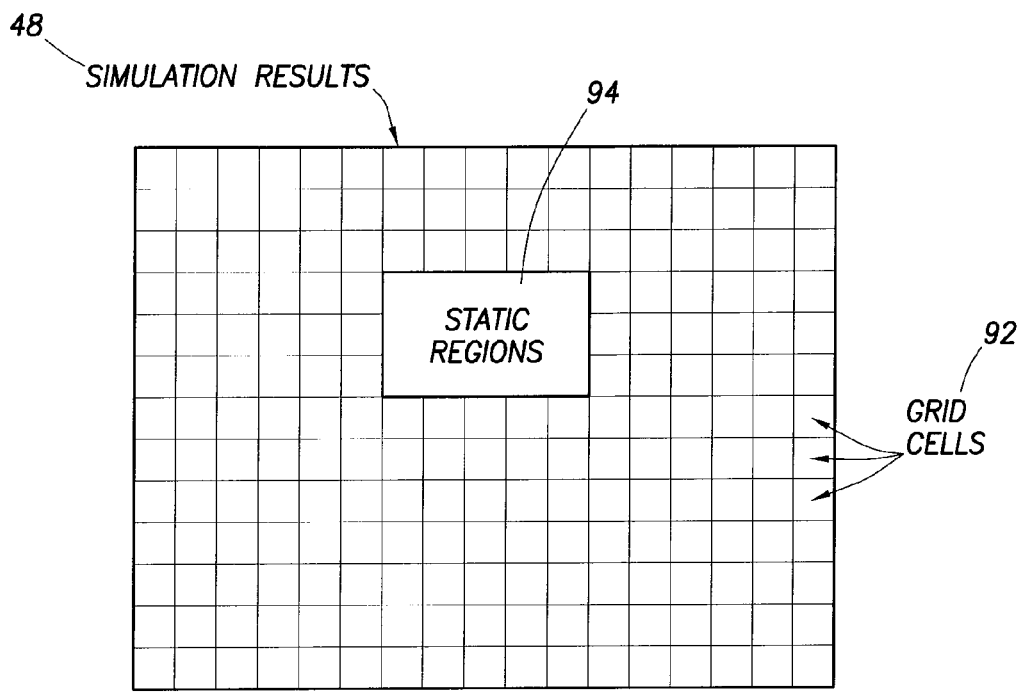
FIG. 12 illustrates the simulation results of FIG. 8 where the simulation results include a plurality of grid cells and static regions which may exist among the grid cells.
Figure 13:
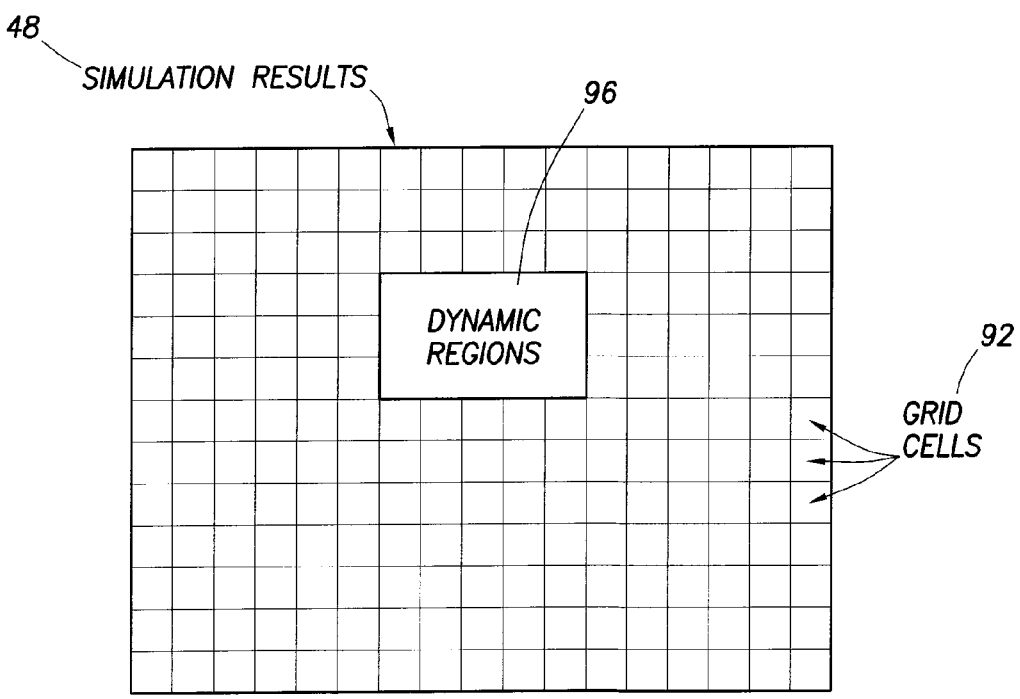
FIG. 13 illustrates the simulation results of FIG. 8 where the simulation results include a plurality of grid cells and dynamic regions which may exist among the grid cells.

Referring to FIG. 10, one of the grid cells 92a of the plurality of grid cells 92 of FIGS. 12 and 13 is illustrated. In FIG. 10, the grid cell 92a includes two 'regions' (although additional regions are possible): (1) a static region 92a1 having a 'region value', and (2) a dynamic region 92a2 also having a 'region value'. Additional regions can also be established in the grid cell 92a of FIG. 10, such as a third region wherein a saturation table is assigned to this third region of the model using the SATNUM keyword and a fourth region wherein an equation of state is assigned to this fourth region of the model using the EOSNUM keyword, the third region using the SATNUM keyword and the fourth region using the EOSNUM keyword being discussed later in this specification. In FIG. 10, the static region 92a1 including its 'region value' and the dynamic region 92a2 including its 'region value' will be discussed in greater detail in the following paragraphs of this specification.

Referring to FIGS. 11 through 16, the 'Method for Defining Regions in Reservoir Simulation', as disclosed in this specification, is illustrated. Recall that this specification discloses a 'Method for Defining Regions in Reservoir Simulation' (including an associated system and program storage device and computer program) which would allow a user to define 'static' and 'dynamic' regions within one or more of the 'grid cells' of a reservoir simulator. The 'statically' defined regions are called 'Static regions', and the 'dynamically' defined regions are called 'Dynamic regions'. A 'Static region' and a 'Dynamic regions' are both based on complex logical definitions that can be statically and dynamically defined.

Although a 'Static region' is based on complex logical definitions that can be statically defined, a 'Static region' is not allowed to change dynamically, which means that, once the 'static region' has been defined, the region values associated with the 'static region' will never change.

However, a 'Dynamic region' is allowed to change 'dynamically', which means that the region values associated with the 'dynamic region' may be recomputed. As a result, although a 'Dynamic region' is based on complex logical definitions that can be dynamically defined, since the region values within each of the grid cells of the 'Dynamic region' may be recomputed, the 'Dynamic region' is further based on 'when' a set of 'conditions' are satisfied, where the 'conditions' are defined via Boolean logic and collections of objects ("Set theory"). This will allow 'property and reporting regions' to be defined and altered, throughout the simulation run, by a user supplied definition. For example, the user may wish to define a 'Dynamic region' based on a 'condition' involving one of the following: (1) finding the element of, and membership in, a specific collection, such as a distance to a production well assuming we are not in a specific region, or (2) finding grid cells which belong to both 'Region 1' and 'Region 2', or (3) determining when the grid cell pressures exceed a specified value, or (4) determining when the block water saturation and the cell depth are above a specified value. This information would then be output to the print file, restart file, and summary file which would then be used by the client in order to visualize the results.

In addition, these 'Static regions' and 'Dynamic regions' can be used with ECLIPSE keywords, a concept which will be discussed in more detail below.

Figure 11:
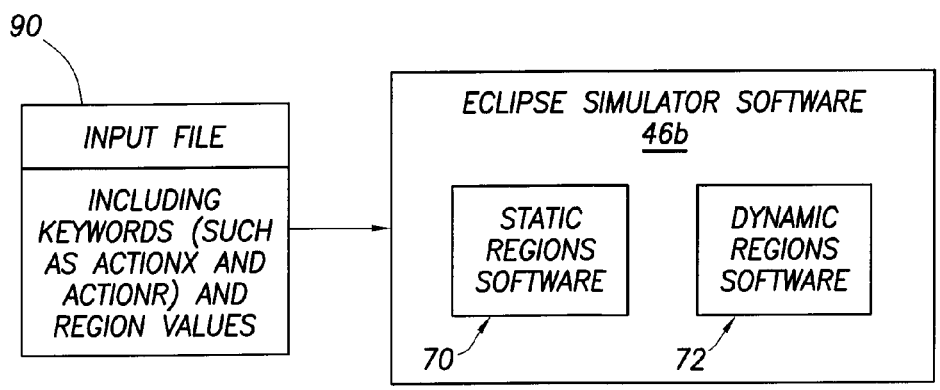
FIG. 11 illustrates the Eclipse simulator software of FIG. 5 which includes a static regions software and a dynamic regions software that is adapted to practice a 'Method for Defining Regions in Reservoir Simulation'(including its associated system and program storage device and computer program) that is disclosed in this specification.

In FIG. 11, the ECLIPSE simulator software 46b of FIGS. 5, 6 and 7 includes a 'Static region' software 70 and a 'Dynamic region' software 72. The 'Static region' software 70 can define 'static' regions, having region values, within one or more of the 'grid cells' of FIGS. 8 and 12 of the ECLIPSE reservoir simulator 46b, where the region values within the 'grid cells' of the 'static' regions will never change. The 'Dynamic region' software 72 can define 'dynamic' regions, having region values, within another one or more of the 'grid cells' of FIGS. 8 and 13 of the ECLIPSE reservoir simulator 46b, where the region values within the 'grid cells' of the 'dynamic' regions may be recomputed based on 'when' a set of 'conditions' are satisfied. The 'conditions' are defined by way of Boolean logic and Set theory.

In FIG. 11, the ECLIPSE reservoir simulator 46b receives input data from an Input File 90 and, responsive thereto, generates a set of 'simulation results' 48, an example of which is shown in FIGS. 8, 12 and 13. The Input File 90 includes 'Keywords' (such as the ACTIONX 'keyword' and the ACTIONR 'keyword') and Region Values. Input data for ECLIPSE reservoir simulators 46b is prepared in free format using a 'keyword' system. Any standard editor may be used to prepare the input file, normally called a '*.DATA' file. Inside this '*.DATA' file, there are 9 separate 'sections': (1) set up overall simulation information, (2, 3) set up grid geometry and grid cell properties, (4) set up fluid properties, (5) set up region information, (6) initialization of the model, (7) output summary information for post-processing, (8) definition of wells, completions etc, and time-stepping of simulation model, and (9) use of an optimization facility. Each of these different 'sections' (1) through (9) contain 'keywords'. A 'keyword' may be supplied on its own or it may be supplied with additional information. The software will read the 'keyword' (and any information that this keyword contained) and process the 'keyword' according to: (1) the 'section' in which the 'keyword' was placed, and (2) the purpose of that 'keyword'.

In FIG. 12, an example of the simulation results 48 of FIG. 8 is illustrated. In FIG. 12, the simulation results 48, which are generated by the ECLIPSE reservoir simulator 46b of FIG. 11, includes a plurality of 'grid cells' 92, where each 'grid cell' 92 can be a structured grid cell or an unstructured grid cell, as discussed in U.S. Pat. No. 6,106,561 to Farmer entitled "Simulation Gridding method and apparatus including a structured areal gridder adapted for use by a reservoir simulator", the disclosure of which has already been incorporated by reference into this specification.

In FIGS. 11 and 12, when the workstation processor 44d of FIG. 5 executes the ECLIPSE simulator software 46b of FIG. 11 including the 'Static Region software' 70 of FIG. 11, while receiving the input data from the Input File 90 of FIG. 11, the ECLIPSE simulator software 46b will generate the set of simulation results 48 that is shown in FIG. 12, where the simulation results 48 of FIG. 12 include: (1) a plurality of 'grid cells' 92, and (2) one or more 'Static Regions' 94 within one or more of the 'grid cells' 92 of FIG. 12.

In FIG. 12, the one or more 'Static Regions' 94, although based on complex logical definitions that can be statically defined, are not allowed to change dynamically, which means that, once the 'static region' 94 has been defined, the region values associated with the 'static region' 94 will never change.

In FIGS. 11 and 13, when the workstation processor 44d of FIG. 5 executes the ECLIPSE simulator software 46b of FIG. 11 including the 'Dynamic Region software' 72 of FIG. 11, while receiving the input data from the Input File 90 of FIG. 11, the ECLIPSE simulator software 46b will generate the set of simulation results 48 that is shown in FIG. 13, where the simulation results 48 of FIG. 13 include: (1) a plurality of 'grid cells' 92, and (2) one or more 'Dynamic Regions' 96 within one or more of the 'grid cells' 92 of FIG. 13.

In FIG. 13, the one or more 'Dynamic Regions' 96, although based on complex logical definitions that can be dynamically defined, are each allowed to change 'dynamically', which means that the region values associated with the 'dynamic region' 96 may be recomputed. As a result, since the region values within each of the 'grid cells' 92 enclosed by the 'Dynamic region' 96 may be recomputed, the 'Dynamic region' 96 is further based on 'when' a set of 'conditions' are satisfied, where the 'conditions' are defined via Boolean logic and collections of objects ("Set theory").

Figure 14:
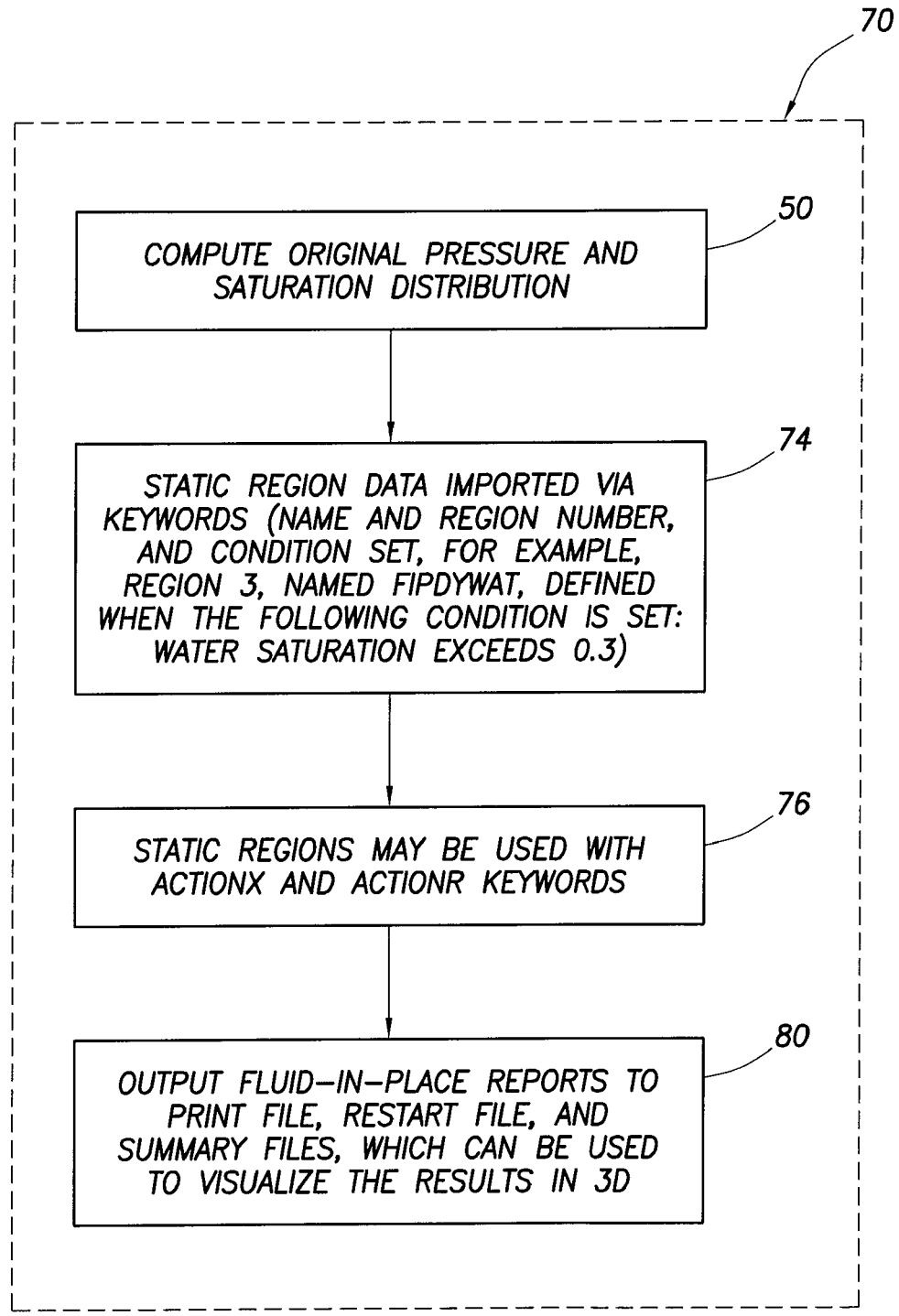
FIG. 14 illustrates a 'method for defining static regions' in reservoir simulation.

In FIG. 14, the 'Static region' software 70 of FIG. 11 is illustrated.

Recall from FIG. 9 that the 'general outline of the operation of a reservoir simulator' 46b includes the following steps: (1) an 'obtain reservoir data and compute original pressure and saturation distributions' step 50, (2) a 'read time varying data' step 52, (3) a 'compute nonlinear finite difference equations and then linearize them' step 54, (4) an 'iteratively solve the linear equations' step 56, (5) a test step involving 'are the nonlinear terms converged' step 58, (6) an 'update values to complete the timestep' step 60, (7) another test step involving 'has the simulation reached the stop time' step 62, and (8) an 'advance time to the next level' step 64.

In FIGS. 9, 12 and 14, some of the regions of 'grid cells' 92 associated with the simulation results 48 of FIG. 12 may be defined to be 'static' (hereinafter called 'static regions' 94). These 'static regions' 94 are considered to be 'static' because 'static regions' are not allowed to change dynamically, which means that, once the static region has been defined, the 'region values' associated with the 'grid cells' in the 'static regions' will never change. However, 'static regions' 94 of FIG. 12 are defined at an 'initial time', where the 'initial time' will begin when step 50 of FIG. 9 and FIG. 14 has been completed. That is, when the practice of step 50 of FIGS. 9 and 14 is complete, these 'Static Regions' 94 are then defined in connection with the use of ECLIPSE 'keywords'. However, in addition, the 'static regions' 94 of FIG. 12 may also be defined 'only once' during the practice of steps 54 through 62 of FIG. 9. The 'static regions' 94 are defined 'only once' during the practice of steps 54 through 62 of FIG. 9 because, after a 'unique static region' has been defined during the practice of steps 54 through 62 of FIG. 9, the region values for this 'unique static region' are not altered.

In connection with the use of 'keywords', recall that the input data for the Input File 90 associated with the ECLIPSE reservoir simulator 46b of FIG. 11 is prepared in 'free format' using a 'keyword' system, wherein the ECLIPSE simulator software 46b will read the 'keyword' (and any information that this keyword contained) from the Input File 90 of FIG. 11, and, responsive thereto, the ECLIPSE simulator software 46b will process the 'keyword' according to the 'section' in which the 'keyword' was placed, and the purpose of that 'keyword'.

In FIGS. 5, 9, 12, and 14, a set of 'reservoir data', which includes the 'well log output record' 42 of FIG. 5 and the 'reduced seismic data output record' 24a of FIG. 5 and 'rock core data', are used to describe the 'computational grid' of FIG. 12 (which includes the grid cells 92) and the 'properties of the reservoir rocks'. This 'reservoir data' is combined with 'data relating to the physical properties of the fluids contained in the reservoir', thereby generating a set of 'combined data'; and the 'combined data' is used to compute the 'initial distributions of pressure and fluid saturations (volume fractions)' as well as the 'composition of each fluid phase', as indicated by step 50 in FIGS. 9 and 14. When the practice of step 50 of FIGS. 9 and 14 is complete, the 'initialization of the model' is complete. The user will then be able to set up "static" regions based on complex 'logical definitions', as illustrated in step 70 in FIG. 11 and further illustrated in steps 74, 76 and 80 in FIG. 14. Recall again that the user may also set up "static" regions based on complex 'logical definitions' only 'once' during the practice of steps 54 through 62 of FIG. 9. One example of a 'logical definition' is the following 'condition' that is illustrated in step 74 of FIG. 14: the user may wish to set up a "static" region 94 of FIG. 12 in only those 'grid cells' 92 of the simulation results 48 of FIG. 12 that have a "region water saturation>0.3 at the Initial Time" (i.e., where the 'initial time' commences when the practice of step 50 in FIGS. 9 and 14 is complete).

In FIG. 14, after completion of the 'compute original pressure and saturation distribution' step 50 of FIGS. 9 and 14, the 'Static Region' software 70 of FIG. 11 includes three basic steps 74, 76 and 80 which are discussed below with reference to FIG. 14, as follows:

(Step 1) Compute original pressure and saturation distribution, step 50 (from FIG. 9);

(Step 2) Static Region data imported (from the Input File 90) via keywords—name and region number and condition set, for example, region 3, named FIPDYWAT, defined when the following condition is set: water saturation in grid cell exceeds 0.3, step 74 in FIG. 14; and (Step 3) Static Regions may be used with ACTIONX and ACTIONR keywords, step 76 in FIG. 14; and (Step 4) Output Fluid-in-place reports to print file, restart file and summary files, which can be used to visualize the results in 3D, step 80 in FIG. 14.

In step 80 in FIG. 14, at a particular point of the simulation, the user will be able to request that the 'static regions' 94 of FIG. 12 be output to the ECLIPSE print file, restart file and summary files. The ECLIPSE results output will also enable the user to visualize the results. See FIG. 16 for a visualization tool, wherein the 'static regions' 94 of FIG. 12 can be visualized.

Figure 15:
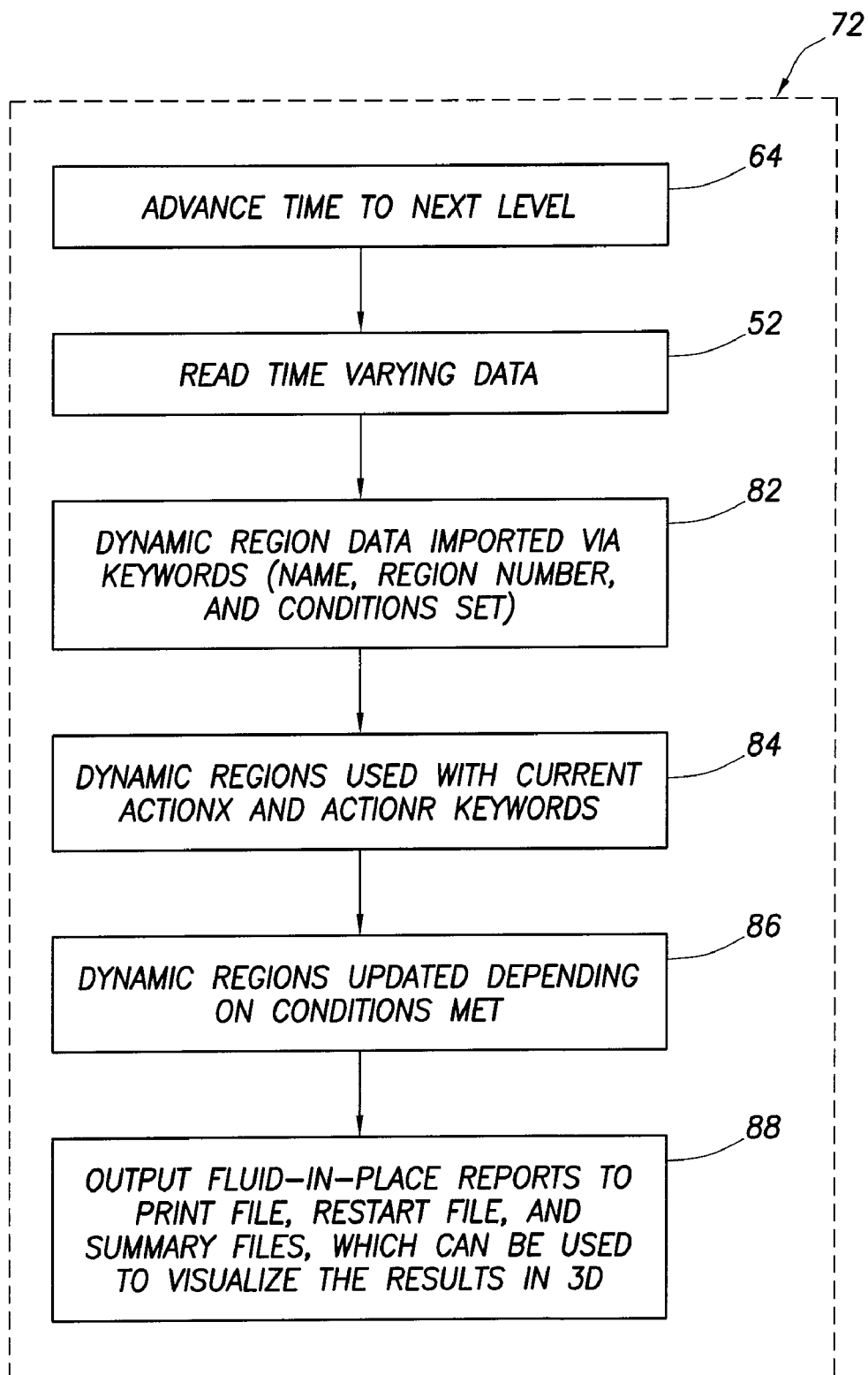
FIG. 15 illustrates a 'method for defining dynamic regions' in reservoir simulation.

In FIG. 15, the 'dynamic region' software 72 of FIG. 11 is illustrated.

Recall again from FIG. 9 that the 'general outline of the operation of a reservoir simulator' 46b includes the following steps: (1) an 'obtain reservoir data and compute original pressure and saturation distributions' step 50, (2) a 'read time varying data' step 52, (3) a 'compute nonlinear finite difference equations and then linearize them' step 54, (4) an 'iteratively solve the linear equations' step 56, (5) a test step involving 'are the nonlinear terms converged' step 58, (6) an 'update values to complete the timestep' step 60, (7) another step test involving 'has the simulation reached the stop time' step 62, and (8) an 'advance time to the next level' step 64.

In FIGS. 9, 13, and 15, some of the regions of 'grid cells' 92 associated with the simulation results 48 of FIG. 13 may be defined to be 'dynamic' (hereinafter called 'dynamic regions' 96). These 'dynamic regions' 96 are considered to be 'dynamic' because the 'dynamic regions' 96 are allowed to change 'dynamically', which means that the region values associated with the 'grid cells' of the 'dynamic regions' 96 may be recomputed. However, these 'dynamic regions' 96 will be allowed to change 'dynamically', and the region values associated with the 'grid cells' of the 'dynamic regions' 96 may be recomputed, only when certain 'conditions' (defined in step 82 of FIG. 15) are met and satisfied, and then only during the practice of steps 52 through 62 in FIG. 9. After the completion of step 62 of FIG. 9, these 'Dynamic Regions' can be used with the ECLIPSE 'keywords'.

The 'dynamic region' functionality associated with the Dynamic Region software 72 of FIG. 11 will allow 'property and reporting region values' to be defined and altered throughout the simulation run (of steps 52 through 62 in FIG. 9) by the 'user definition'. For example, it will be very useful to be able to follow fluid with tracers and utilize 'dynamically changing PVT regions' by marking the fluid with the tracer that will then allow the fluid properties to follow the fluid. In addition, it would be useful to focus on an area of the reservoir model in order to visualize all the 'grid cells' 92 of FIG. 13 whose fluid moves towards the well (focusing on the drainage radius for a production well); or for finding areas of remaining mobile oil, for example, and where to drill the next well based on certain criteria.

In FIG. 9, the simulator 46b (of FIG. 11) will test to determine whether the desired ending time (i.e. the stop time 62 of FIG. 9) in the simulation has been reached. If not, the simulator advances time to the next level, step 64 of FIG. 9, and then it returns to step 52 in order to read new time varying data, such as the locations and characteristics of wells, production and injection flow rate controls, and simulator control information, and to begin the next timestep.

In FIG. 15, an example is illustrated of 'Dynamic Region' use within the simulator after time has been advanced to a new level (step 64 of FIG. 9) and time varying data has been read (step 52 of FIG. 9).

In FIG. 15, after time has been advanced to a new level (step 64 of FIGS. 9 and 15) and time varying data has been read (step 52 of FIGS. 9 and 15), the Dynamic Region software 72 of FIG. 11 includes four basic steps 82, 84, 86 and 88 of FIG. 15 which are discussed below with reference to both FIG. 15, as follows:

(Step 1) Advance time to the next level, step 64;
(Step 2) Read time varying data, step 52
(Step 3) Dynamic Region data imported (from Input File 90) via keywords—name, region number, and complex 'conditions' set, step 82 in FIG. 15;
(Step 4) Dynamic Regions used with current ACTIONX and ACTIONR keywords, step 84 of FIG. 15;
(Step 5) Dynamic Regions updated depending on the 'conditions' (of step 82) being met, step 86 in FIG. 15; and
(Step 6) Output Fluid-in-place reports to print file, restart file and summary files, which can be used to visualize the results in 3D, step 88 in FIG. 15.

Each of these steps 82, 84, 86, and 88 of FIG. 15 will be discussed below, as follows.

In FIG. 15, step 82, there can be many 'Dynamic Regions' 96 of FIG. 13 set up for a particular model, as indicated in step 82 of FIG. 15. Each 'Dynamic Region' 96 will be assigned a family name and a number, step 82 of FIG. 15. For a particular family and region number, a set of 'conditions' will be defined, step 82 in FIG. 15. Examples of these 'conditions' could be the following: (1) when the grid cell pressure>1000; (2) when the grid cells are above twice average pressure; (3) when water saturation>grid cell value; (4) when the distance to the well<grid cell value+for equilibration region 1 only. These 'conditions' set forth in step 82 in FIG. 15 can also become quite complex, as indicated in the following example:

BPR>2*FPR
Distance to k
cell "belongs to" [I1,I2][J1,J2]
NEWR2="does not belong to" (NEWR1 "union" FIP_5)
Check "sum over" NEW REGIONS=FIELD
Drainage region In FIG. 15, step 84, in the Input File 90 of FIG. 11, the user will need to provide a new keyword definition in order to specify these "Dynamic Regions" inside the ECLIPSE simulator software 46b of FIG. 11, step 84 of FIG. 15.

In FIG. 15, step 84, it would also be extremely beneficial to allow the use of 'Dynamic Regions' inside the ECLIPSE reservoir simulator 46b by using a set of 'keywords', such as ACTIONX and ACTIONR, step 84 in FIG. 15. These ACTION keywords can be used to mark the start of a set of keywords that are to be stored for later processing when a 'nominated fluid-in-place region' satisfies a specified condition (e.g. region pressure>3000, or region water saturation average value>0.6). The 'nominated fluid-in-place region' would refer to the 'Dynamic Regions' 96 previously defined.

In FIG. 15, step 84, in order to illustrate step 84 of FIG. 15 using an example, we now provide a sample keyword definition from the ACTION family of ECLIPSE keywords. In this example, we use the ACTIONR keyword. For this particular case, the 'action' (named ACT7) reduces the oil rate target of well PROD3 by 20% whenever the average gas saturation in region 3 of the Dynamic Region DYNMR exceeds 0.05:

```
ACTIONR
  ACT7  3  FIPDYNMR  RGSAT > 0.05  10000 /
WTMULT
  PROD3  ORAT  0.8  /
/
ENDACTIO
```

In the above example, Dynamic Region 3 (with family name FIPDYNMR) is being used. This region could have previously been defined based on when the cell pressures in grid blocks closest to another well ('PROD2') is greater than 1000 psi, and also, when distance to well 'PROD2' is less than 500 feet. Refer to the current "2007.1 ECLIPSE Reference Manual documentation" for a detailed explanation of the keywords, ACTIONR, WTMULT and ENDACTIO, used in the example above, the disclosure of which is incorporated by reference into the specification of this application.

In FIG. 15, step 86, during the simulation of the model, whenever the 'conditions' specified in step 82 of FIG. 15 have been met and satisfied, the 'region values' associated with the 'dynamic' regions 96 of FIG. 13 will be automatically updated, step 86 in FIG. 15.

In FIG. 15, step 88, at a particular point of the simulation, the user will be able to request that the 'dynamic' regions 96 of FIG. 13 be output to the ECLIPSE print file, restart file and summary files. The ECLIPSE results output will also enable the user to visualize the results.

Figure 16:
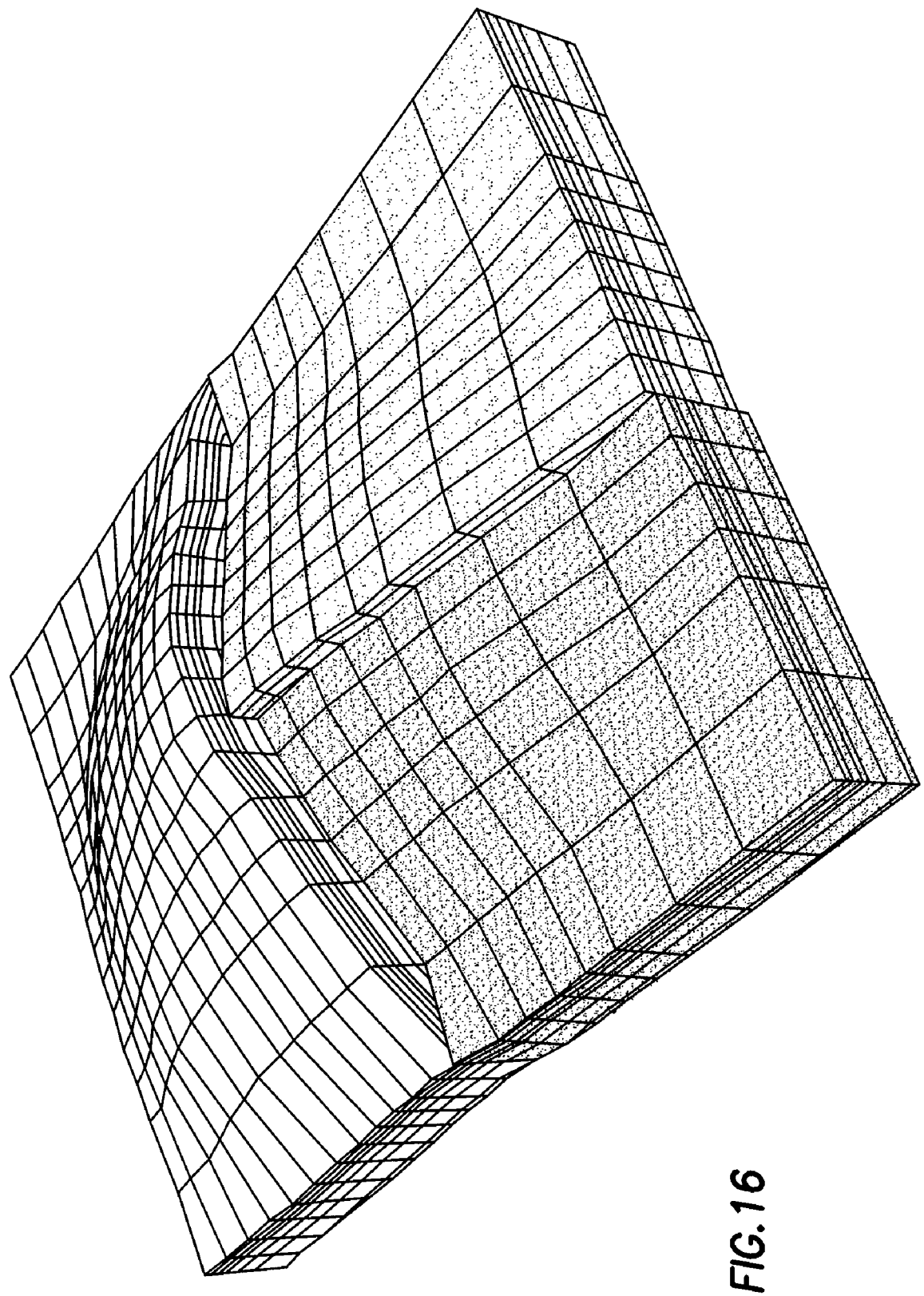
FIG. 16 illustrates a visualization tool which displays all the user defined 'regions' (including 'static' regions and 'dynamic' regions) that are used when running a simulation model, FIG. 13 illustrating a simulation model that displays three different 'regions'.

In FIG. 16, a visualization tool is illustrated, wherein the 'static regions' 94 and the 'dynamic regions' 96 of FIGS. 12 and 13 can be visualized. In FIG. 16, since each 'region' defined (whether the user chooses "static regions" 94 or "dynamic regions" 96) has a unique name, it is possible to display all these 'regions', including all reported 'simulator steps' taken to run the model, by using the 'visualization tool' of the type illustrated in FIG. 16. In FIG. 16, the simulation model displays three different regions. The results shown in FIG. 16 are for FIPTEST, defined only once at initialization. This display will show areas or 'regions' where the water saturation in each cell is <0.3 (region 2) and the water saturation is >0.6 (region 3). All other values will be defined as 'region 1'. Therefore, the FIPTEST output illustrated in FIG. 16 will have three (3) separate regions defined.

The workflow illustrated in FIGS. 14 and 15 as described above could be very useful to simulate simple geomechanic type models, and to make it easier to facilitate fracture modeling within both simulators. The new concept presented in this specification will allow fluid properties to follow the fluid, and so it could appeal to a broad spectrum of current ECLIPSE users worldwide. For instance, it would allow complex field management strategies to be used together with ACTIONX, and also allow the properties of the fluid to follow its corresponding fluid. In addition, better fluid modeling could also be achieved by following a front based on solution changes, for instance, tracking areas which have been swept by injected gas.

The use of Static and Dynamic Regions presented in this specification could also help to focus on an area of the model in order to visualize all the grid cells whose fluid moves towards the well (focusing on the drainage radius for a production well); or for finding areas of remaining mobile oil, for example, where to drill the next well based on a certain criterion. This would also help in the study of reservoirs where fluids with very different properties were present or injected.

A functional description of the 'Method for Defining Regions in Reservoir Simulation' disclosed in this specification is set forth in the following paragraphs with reference to FIGS. 1 through 16 of the drawings.

In FIGS. 1 through 9, an acoustic energy source 10 of FIG. 1 transmits acoustic signals 12 which reflect off horizons 14, are received in geophones 18 of FIG. 1, are received in a recording truck 22, and a seismic data output record 24 of FIG. 1 is generated. The seismic data output record 24 undergoes data reduction 30 in FIG. 3 thereby generating a reduced seismic data output record 24a of FIGS. 1 and 3. In FIG. 2, well log data 38 is received from a well logging tool 34 disposed in a borehole 36 thereby generating a well log output record 42 of FIG. 2. The well log output record 42 and the reduced seismic data output record 24a, which collectively comprise a part of a set of 'reservoir data', are received in the workstation 44 of FIG. 5 and are stored in the 'reservoir data store' of FIG. 6. The workstation memory 44a stores a 'Flogrid' software 46a and an ECLIPSE simulator software 46b. In FIG. 6, the 'reservoir data' in the 'reservoir data store' is received in the 'reservoir framework' wherein a framework of a reservoir is constructed. In FIG. 6, the 'structured gridder' will grid the 'reservoir framework' by incorporating a multitude of 'structured grid cells' within the 'reservoir framework'. In FIG. 6, the 'Petragrid un-structured gridder' will grid the 'reservoir framework' by incorporating a multitude of 'un-structured grid cells' within the 'reservoir framework'. In FIG. 6, an 'upscaler' will upscale at least some of the 'structured grid cells' in the 'reservoir framework' thereby generating a 'reservoir framework' having 'upscaled structured grid cells'. In FIGS. 6 and 7, the ECLIPSE simulator software 46b will receive the 'reservoir framework' which includes the 'upscaled structured grid cells' and the 'un-structured grid cells', and, responsive thereto, the ECLIPSE simulator software 46b will generate a set of simulation results 48, where the simulation results 48 in FIG. 6 include the 'reservoir framework' that incorporates the 'upscaled structured grid cells' and the 'un-structured grid cells'. The simulation results are recorded or displayed on the '3D Viewer' 44e. In FIG. 8, one example of the simulation results 48 displayed on the '3D Viewer' 44e is illustrated. In FIG. 8, note that the simulation results 48 include a 'reservoir framework' that further incorporates or includes a multitude of 'grid cells', the 'grid cells' including 'structured grid cells' and 'un-structured grid cells', each 'grid cell' further including one or more characteristics of the reservoir, such as permeability or resistivity or transmissibility. In FIG. 9, recalling that the ECLIPSE simulator software 46b of FIGS. 6 and 7 generates the simulation results 48 of FIG. 8 including the multitude of 'grid cells', the ECLIPSE simulator software 46b functions to practice the following basic steps. In FIG. 9, reservoir data 42 and 24a of FIG. 5 and 'rock core data' are used to describe a computational grid and the properties of the reservoir rocks. This data is combined with data relating to the physical properties of the fluids contained in the reservoir, the combined data being used to compute the initial distributions of pressure and fluid saturations (volume fractions) as well as the composition of each fluid phase, block 50 in FIG. 9. Time varying data, such as the locations and characteristics of wells, production and injection flow rate controls, and simulator control information, is read from a data base, block 52. Using the current pressure, saturation, and fluid compositions for each grid cell, the partial differential equations describing mass balances are approximated by finite differences in block 54 which results in two or more nonlinear algebraic equations for each grid cell. Also, in block 54, these nonlinear equations are linearized by means of Newton's method. In block 56, the resulting system of linear equations is solved iteratively. After the linear equations have been solved, there is a test in block 58 to determine whether all of the nonlinear terms in the finite difference equations have converged. If not, the simulator returns to block 54. If the nonlinear terms in the finite difference equations have converged, the simulator moves to block 60 and updates values to complete the current timestep. In block 62, the simulator tests to determine whether the desired ending time (i.e., the stop time) in the simulation has been reached. If not, the simulator advances time to the next level, block 64, and then it returns to block 52 to read new time varying data and to begin the next timestep. If the endpoint of the simulation has been reached, then, the simulator completes output operations and the run is finished, block 66.

In FIG. 11, recalling that this specification discloses a 'Method for Defining Regions in Reservoir Simulation', the ECLIPSE simulator software 46b of FIG. 11 will import 'Static region data' (including name and region number and conditions that are set) and 'Dynamic region data' (including name, region number, and conditions that are set) from the Input File 90 of FIG. 11. The ECLIPSE simulator software 46b will read the 'keyword' (and any information that this keyword contained) from the Input File 90 of FIG. 11, and, responsive thereto, the ECLIPSE simulator software 46b will process the 'keyword' according to the section in which the 'keyword' was placed and the purpose of that keyword.

In FIGS. 11 and 12, the workstation processor 44d of FIG. 5 will execute the Static Regions software 70 of the ECLIPSE simulator software 46b of FIG. 11, while utilizing the above referenced 'Static region data', and, responsive thereto, the processor 44d will generate a set of simulation results 48 of FIG. 12, where the simulation results 48 of FIG. 12 include a 'framework', a plurality of structured and unstructured grid cells 92 disposed within that 'framework', and one or more 'Static regions' 94 within one or more of the grid cells 92, as shown in FIG. 10. The 'Static regions' 94 of FIG. 12 are defined at 'initialization time' (i.e., upon the completion of step 50 of FIGS. 9 and 14). The 'Static regions' 94 may also be established only once during the practice of steps 54 through 62 of FIG. 9. However, the 'Static regions' 94 of FIG. 12 cannot be allowed to change dynamically, which means that, when the static region has been defined at 'initialization time' or once during the practice of steps 54 through 62 of FIG. 9, the 'region values' associated with the grid cells 92 of the 'Static regions' 94 will never change. In FIG. 14, when the processor 44d executes the Static Regions software 70 of FIG. 11, the following steps are practiced by the processor 44d: (Step 1) In the 'Compute original pressure and saturation distribution step 50 in FIGS. 9 and 14', recall that the 'reservoir data' (which includes the 'well log output record' 42 of FIG. 5 and the 'reduced seismic data output record' 24a of FIG. 5 and 'rock core data') are used to describe the 'computational grid' 92 of FIG. 12 and the 'properties of the reservoir rocks'; and this 'reservoir data' is combined with 'data relating to the physical properties of the fluids contained in the reservoir', thereby generating a set of 'combined data'; and the 'combined data' is used to compute the 'initial distributions of pressure and fluid saturations (volume fractions)' as well as the 'composition of each fluid phase', step 50 in FIGS. 9 and 14; (Step 2) Upon completion of step 50 of FIGS. 9 and 14, the 'initialization of the model' is complete and, at this moment, the 'Initial Time' begins. At the 'Initial Time', the 'static' regions 94 of FIG. 12 are established. In addition, the 'static' regions 94 may also be established 'only once' during the practice of steps 54 through 62 of FIG. 9. However, in either case, the 'static' regions 94 are established based on complex 'logical definitions'; for example, the user may wish to establish a 'static' region 94 in the grid cells 92 of FIG. 12 based on the following 'logical definition: a 'static' region is established in only those 'grid cells' 92 of the simulation results 48 of FIG. 12 that have a "region water saturation>0.3 at the Initial Time". Therefore, in order to establish the 'static' region 94 of FIG. 12, 'Static Region data' is imported from the Input File 90 of FIG. 11 by using the keywords disposed in the Input File 90, the 'Static Region data' including: name and region number and a 'condition' that is set (and recall again that one example of a 'condition' is: a 'static' region is set up in only those 'grid cells' 92 of the simulation results 48 of FIG. 12 that have a "region water saturation>0.3 at the Initial Time"), step 74 in FIG. 14; (Step 3) The Static Region software 70 may use and process the ACTIONX and ACTIONR keywords in the Input File 90, step 76 in FIG. 14; and (Step 4) Using the Visualization Tool illustrated in FIG. 16, the processor 44d will generate 'Fluid-in-place reports' which will be transmitted to the print file, the restart file, and the summary files, the Visualization Tool allowing a user to visualize the results in 3D, step 80 in FIG. 14.

In FIGS. 11 and 13, the workstation processor 44d of FIG. 5 will also execute the Dynamic Regions software 72 of the ECLIPSE simulator software 46b of FIG. 11, while utilizing the above referenced 'Dynamic region data', and, responsive thereto, the processor 44d will generate a set of simulation results 48 of FIG. 13, where the simulation results 48 of FIG. 13 include a 'framework', a plurality of structured and unstructured grid cells 92 disposed within that 'framework', and one or more 'Dynamic regions' 96 within one or more of the grid cells 92, as illustrated in FIG. 10. The 'Dynamic regions' 96 can be allowed to change dynamically, which means that, after time has advanced to the next level (step 64 of FIGS. 9 and 15) and time varying data has been read (step 52 of FIGS. 9 and 15), the 'region values' associated with the grid cells 92 of the 'Dynamic regions' 94 can be recomputed depending on 'when' one or more 'conditions' are met. That is, after time has advanced to the next level (step 64 of FIGS. 9 and 15) and time varying data has been read (step 52 of FIGS. 9 and 15), and, subsequently during a 'simulation run' (i.e., during the execution of steps 54 through 62 of FIG. 9), when one or more 'conditions' associated with one or more of the grid cells 92 of FIG. 13 are met, the 'region values' associated with the grid cells 92 of the 'Dynamic regions' 94 of FIG. 13 can then be recomputed. In FIG. 15, when the processor 44d executes the Dynamic Regions software 72 of FIG. 11, while using the ECLIPSE 'keywords' in the Input file 90, the following steps are practiced by the processor 44d: (Step 1) Advance time to the next level, step 64, (Step 2) Read time varying data, step 52; (Step 3) After time has advanced to the next level (step 64 of FIGS. 9 and 15) and time varying data has been read (step 52 of FIGS. 9 and 15), the dynamic regions 96 of FIG. 13 are established. The dynamic regions 96 of FIG. 13 are established by importing the Dynamic Region data from the Input File 90 using the keywords in the Input File 90, where the Dynamic Region data includes: name, region number, and complex 'conditions' that are set, step 82 in FIG. 15; (Step 4) The Dynamic Regions are used with current ACTIONX and ACTIONR keywords, step 84 of FIG. 15; (Step 5) At this time, the 'region values' associated with the grid cells 92 of the 'Dynamic regions' 96 are updated; that is, the 'region values' of the 'Dynamic Regions' can be recomputed depending on 'when' one or more of the 'conditions' of step 82 are met, step 86 in FIG. 15; and (Step 6) Using the Visualization Tool illustrated in FIG. 16, the processor 44d will generate 'Fluid-in-place reports' which will be transmitted to the print file, the restart file, and the summary files, the Visualization Tool allowing a user to visualize the results in 3D, step 88 in FIG. 15.

Consider the following example:

Every grid cell in a simulation model is assigned a 'region number' for many reasons, for example: (1) to assign a specific saturation table to a region of the model (using the SATNUM keyword); and (2) to assign a different Equation of State to different regions of the model (using the EOSNUM keyword). Each grid cell can contain many more 'region numbers'. However, in this example, the model has two (2) specified regions, one for SATNUM and the other for EOSNUM. As a result, each grid cell in this model will contain two different regions. These keywords (SATNUM and EOSNUM) are read into ECLIPSE with integer values denoting the region number, one region value for each grid cell in the model.

However, the user is also allowed to define regions based on complex 'logical definitions'. Therefore, instead of utilizing the user entering keywords (SATNUM) together with integer values (1, 2 . . . ), the user can also choose to define a region (FIPDYNR1) based on logical definition/set theory: for example, the user can set up a region value for each grid cell in the model depending on the condition that water saturation in the grid cell is <0.3.

Furthermore, assume that the FIPDYNR1 set up is accomplished only once, just after initialization of the model (i.e., after completion of step 50 of FIGS. 9 and 14). However, assume further that, during simulation (time-stepping), the user wants to define another region (FIPDYNR2) in each grid cell which will be altered throughout the simulation run depending on the 'oil fluid-in-place' in each grid cell (that is, if BOIP>1,000). As a result, grid cells which satisfies the condition 'oil-in-place>1000' will be set to a 'region value' that is chosen by the user, given the DYNAMICR keyword definition.

As a result, in our example, our model now has 4 regions:
(1) SATNUM (defined by user giving integer values, one for each cell in the model);
(2) EOSNUM (defined by user giving integer values, one for each cell in the model);
(3) FIPDYNR1 (defined by user using complex logical conditions, but since specified only once, using DYNAMICR keyword, defined as "static"); and
(4) FIPDYNR2 (defined by user using complex logical conditions, and to be updated at regular intervals during time-stepping due to definition and use of DYNAMICR keyword—defined as "dynamic").

For this model in our example, every grid cell will contain a SATNUM, EOSNUM, FIPDYNR1 and FIPDYNR2 region value.

Therefore, although a 'static region' is based on complex logical definitions that can be statically defined, a 'static region' is not allowed to change dynamically, which means that, once the 'static region' has been defined, the region values associated with this 'static region' will never change. However, a 'dynamic region' is allowed to change 'dynamically', which means that the region values associated with the 'dynamic region' may be recomputed"

The above description of the 'Method for Defining Regions in Reservoir Simulation' being thus described, it will be obvious that the same may be varied in many ways. Such variations are not to be regarded as a departure from the spirit and scope of the claimed method or system or program storage device or computer program, and all such modifications as would be obvious to one skilled in the art are intended to be included within the scope of the following claims.

We claim:

1. A method practiced by a reservoir simulator for simulating a reservoir and generating a set of simulation results, said simulation results including a framework, the framework further including a plurality of grid cells, comprising:

generating one or more static regions and one or more dynamic regions within the grid cells of the framework of the simulation results, the static and dynamic regions each having region values, one region value for each grid cell wherein region values identify grid cells in a region, wherein the region values of the static regions cannot be allowed to change dynamically, and wherein the region values of the dynamic regions can be allowed to change dynamically;

receiving time varying data for at least one of the one or more dynamic regions;

simulating the reservoir for an advanced time based at least in part on received time varying data; and updating the region values of the one or more dynamic regions depending on whether each of the one or more dynamic regions satisfies one or more conditions of a definition of a dynamic region.

2. The method of claim 1, wherein, when the static region is defined, said region values of the static regions never change.

3. The method of claim 2, wherein, when the time varying data is received, the region values of the dynamic regions are recomputed when one or more of the one or more conditions are met.

4. The method of claim 1, wherein the step of generating one or more static regions within the grid cells of the framework of the simulation results comprises:

computing an original pressure and saturation distribution; and importing static region data, including a region name and a region number and a condition, from an input file using keywords and generating the one or more static regions within the grid cells of the framework, which corresponds to the region name and the region number, when said condition is met.

5. The method of claim 4, wherein, when the static region is generated, said region values of the static regions never change.

6. The method of claim 1, wherein the step of generating one or more dynamic regions within the grid cells of the framework of the simulation results comprises:

importing dynamic region data, including a region name and a region number and one or more conditions, from an input file using keywords and generating the one or more dynamic regions within the grid cells of the framework corresponding to the region name and the region number.

7. The method of claim 6, wherein the region values of the dynamic regions are recomputed when said one or more conditions are met.

8. A program storage device readable by a machine tangibly embodying a set of instructions executable by the machine to perform method steps for simulating a reservoir and generating a set of simulation results, said simulation results including a framework, the framework further including a plurality of grid cells, said method steps comprising:

generating one or more static regions and one or more dynamic regions within the grid cells of the framework of the simulation results, the static and dynamic regions each having region values, one region value for each grid cell wherein region values identify grid cells in a region, wherein the region values of the static regions cannot be allowed to change dynamically, and wherein the region values of the dynamic regions can be allowed to change dynamically;

receiving time varying data for at least one of the one or more dynamic regions;

simulating the reservoir for an advanced time based at least in part on received time varying data; and updating the region values of the one or more dynamic regions depending on whether each of the one or more dynamic regions satisfies one or more conditions of a definition of a dynamic region.

9. The program storage device of claim 8, wherein, when the static region is defined, said region values of the static regions never change.

10. The program storage device of claim 9, wherein, when the time varying data is received, the region values of the dynamic regions are recomputed when one or more of the one or more conditions are met.

11. The program storage device of claim 8, wherein the step of generating one or more static regions within the grid cells of the framework of the simulation results comprises:

computing an original pressure and saturation distribution; and importing static region data, including a region name and a region number and a condition, from an input file using keywords and generating the one or more static regions within the grid cells of the framework, which corresponds to the region name and the region number, when said condition is met.

12. The program storage device of claim 11, wherein, when the static region is generated, said region values of the static regions never change.

13. The program storage device of claim 8, wherein the step of generating one or more dynamic regions within the grid cells of the framework of the simulation results comprises:

importing dynamic region data, including a region name and a region number and one or more conditions, from an input file using keywords and generating the one or more dynamic regions within the grid cells of the framework corresponding to the region name and the region number.

14. The program storage device of claim 13, wherein the region values of the dynamic regions are recomputed when said one or more conditions are met.

15. A computer program adapted to be executed by a processor, said computer program, when executed by the processor, conducting a process for simulating a reservoir and generating a set of simulation results, said simulation results including a framework, the framework further including a plurality of grid cells, said process comprising:

generating one or more static regions and one or more dynamic regions within the grid cells of the framework of the simulation results, the static and dynamic regions each having region values, one region value for each grid cell wherein region values identify grid cells in a region, wherein the region values of the static regions cannot be allowed to change dynamically, and wherein the region values of the dynamic regions can be allowed to change dynamically;

receiving time varying data for at least one of the one or more dynamic regions;

simulating the reservoir for an advanced time based at least in part on received time varying data; and updating the region values of the one or more dynamic regions depending on whether each of the one or more dynamic regions satisfies one or more conditions of a definition of a dynamic region.

16. The computer program of claim 15, wherein, when the static region is defined, said region values of the static regions never change.

17. The computer program of claim 16, wherein, when the time varying data is received, the region values of the dynamic regions are recomputed when one or more of the one or more conditions are met.

18. The computer program of claim 15, wherein the step of generating one or more static regions within the grid cells of the framework of the simulation results comprises:

computing an original pressure and saturation distribution; and importing static region data, including a region name and a region number and a condition, from an input file using keywords and generating the one or more static regions within the grid cells of the framework, which corresponds to the region name and the region number, when said condition is met.

19. The computer program of claim 18, wherein, when the static region is generated, said region values of the static regions never change.

20. The computer program of claim 15, wherein the step of generating one or more dynamic regions within the grid cells of the framework of the simulation results comprises:
importing dynamic region data, including a region name and a region number and one or more conditions, from an input file using keywords and generating the one or more dynamic regions within the grid cells of the framework corresponding to the region name and the region number.

21. The computer program of claim 20, wherein the region values of the dynamic regions are recomputed when said one or more conditions are met.

22. A system adapted for simulating a reservoir while using region data and generating a set of simulation results, said simulation results including a framework which further includes a plurality of grid cells, comprising:
apparatus adapted for generating one or more static regions and one or more dynamic regions among the grid cells of the framework of the simulation results, said regions among the grid cells including static regions of grid cells which cannot be allowed to change dynamically and dynamic regions of grid cells which can be allowed to change dynamically;
apparatus adapted for receiving time varying data for at least one of the one or more dynamic regions;
apparatus adapted for simulating the reservoir for an advanced time based at least in part on received time varying data; and
apparatus adapted for updating region values that identify grid cells in a region of the one or more dynamic regions depending on whether each of the one or more dynamic regions satisfies one or more conditions of a definition of a dynamic region.

23. The system of claim 22, wherein each of the grid cells associated with the static regions has a region value, wherein the static regions of grid cells cannot be allowed to change dynamically because said region values of the grid cells of the static regions never change.

24. The system of claim 23, wherein each of the grid cells associated with the dynamic regions has a region value, wherein the dynamic regions of grid cells can be allowed to change dynamically because said region values of the grid cells of the dynamic regions are recomputed when one or more of the one or more conditions are met.

* * * * *